US009697435B2

United States Patent
Iwamoto et al.

(10) Patent No.: US 9,697,435 B2
(45) Date of Patent: Jul. 4, 2017

(54) LOCAL FEATURE DESCRIPTOR EXTRACTING APPARATUS, LOCAL FEATURE DESCRIPTOR EXTRACTING METHOD, AND PROGRAM

(71) Applicant: NEC Corporation, Tokyo (JP)

(72) Inventors: Kota Iwamoto, Tokyo (JP); Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 14/359,063

(22) PCT Filed: Nov. 15, 2012

(86) PCT No.: PCT/JP2012/079673
§ 371 (c)(1),
(2) Date: May 16, 2014

(87) PCT Pub. No.: WO2013/073622
PCT Pub. Date: May 23, 2013

(65) Prior Publication Data
US 2014/0328543 A1    Nov. 6, 2014

(30) Foreign Application Priority Data
Nov. 18, 2011    (JP) ................. 2011-253223

(51) Int. Cl.
*G06K 9/62* (2006.01)
*G06K 9/46* (2006.01)

(52) U.S. Cl.
CPC ......... *G06K 9/6202* (2013.01); *G06K 9/4604* (2013.01); *G06K 9/4671* (2013.01);
(Continued)

(58) Field of Classification Search
None
See application file for complete search history.

(56) References Cited

U.S. PATENT DOCUMENTS 6,711,293 B1    3/2004 Lowe
2010/0246969 A1  9/2010 Winder et al.
(Continued)

FOREIGN PATENT DOCUMENTS

CN    101714254 A    5/2010
CN    101859326 A    10/2010
(Continued)

OTHER PUBLICATIONS

Kozakaya, Tatsuo. "Facial Feature Localization Using Weighted Vector Concentration Approach." Image and Vision Computing 28, No. 5 (May 5, 2010): 772-80. Accessed Dec. 28, 2015. http://www.sciencedirect.com/science/article/pii/S0262885609001954.*
(Continued)

*Primary Examiner* — Siamak Harandi
*Assistant Examiner* — Kate R Duffy
(74) *Attorney, Agent, or Firm* — Wilmer Cutler Pickering Hale and Dorr LLP

(57) ABSTRACT

An object of the present invention is to reduce a size of a feature descriptor while maintaining accuracy of object identification. A local feature descriptor extracting apparatus includes: a feature point detecting unit which detects a plurality of feature points in an image and which outputs feature point information that is information regarding each feature point; a feature point selecting unit which selects a prescribed number of feature points in an order of importance from the plurality of detected feature points, based on the feature point information; a local region acquiring unit which acquires a local region corresponding to each selected feature point; a subregion dividing unit which divides each local region into a plurality of subregions; a subregion feature vector generating unit which generates a feature vector of a plurality of dimensions for each subregion in each local region; and a dimension selecting unit which
(Continued)

selects a dimension from the feature vector for each subregion so that a correlation between neighboring subregions is lowered, based on a positional relationship between subregions in each local region and which outputs an element of the selected dimension as a feature descriptor of the local region.

10 Claims, 24 Drawing Sheets

(52) U.S. Cl.
CPC .. *G06K 9/6247* (2013.01); *G06T 2207/20021* (2013.01); *G06T 2207/20112* (2013.01)

(56) References Cited

U.S. PATENT DOCUMENTS

| | | | |
|---|---|---|---|
| 2011/0274359 | A1 | 11/2011 | Iwamoto et al. |
| 2014/0321755 | A1 | 10/2014 | Iwamoto et al. |

FOREIGN PATENT DOCUMENTS

| | | |
|---|---|---|
| CN | 102004916 A | 4/2011 |
| CN | 102169581 A | 8/2011 |
| EP | 2383990 A1 | 11/2011 |
| EP | 2782066 A1 | 9/2014 |
| JP | 2010-079545 A | 4/2010 |

OTHER PUBLICATIONS

Fujiyoshi, Hironobu, "Gradient-Based Feature Extraction: SIFT and HOG," IPSJ SIG Notes, vol. 2007, No. 87, pp. 211-224 (Sep. 9, 2007).

Hondo, Takayuki, "Inspection of Memory Reduction Methods for Specific Object Recognition," IPSJ SIG Notes, vol. 2009, No. 29, pp. 171-176 (Mar. 6, 2009).

International Search Report Issued by the Japanese Patent Office for Corresponding International Application No. PCT/JP2012/079673 mailed Jan. 22, 2013 (2 pgs.).

Kise, Koichi, "Specific Object Recognition by Image Matching Using Local Features," Journal of Japanese Society for Artificial Intelligence, vol. 25, No. 6, pp. 769-776 (Nov. 1, 2010).

Kobayashi, Takumi, "Higher-order Local Auto-correlation Based Image Features and Their Applications," The Journal of the Institute of Electronics, Information and Communication Engineers, vol. 94, No. 4, pp. 335-340 (Apr. 1, 2011).

Lowe, David G., "Distinctive Image Features from Scale-Invariant Keypoints," International Journal of Computer Vision, vol. 60(2), pp. 91-110 (2004).

Chinese Notification of First Office Action issued in corresponding Chinese Application No. 201280056804.2, dated Nov. 19, 2015, 11 pages.

Jing Wang, "Study on Automatic Image Marching Method Based on SIFT and Angular Point Detection", WanFang digital database, Sep. 20, 2011, pp. 12-25 (16 pages).

Ahonen, T., et al., "Face Description with Local Binary Patterns: Application to Face Recognition," IEEE Transactions on Pattern Analysis and Machine Intelligence, vol. 28, No. 12, pp. 2037-2041 (Dec. 2006).

Cai, J., et al., "Detecting Human Faces in Color Images," Multi-Media Database Management Systems, Proceedings of International Workshop, Dayton, Ohio, pp. 124-131 (Aug. 5-7, 1998).

Chandrasekhar, V., et al., "Survey of SIFT Compression Schemes," retrieved from the internet: URL:http://www.stanford.edu/mamakar/pub_files/VijayICPR-WMMP2010.pdf, XP002696574, 8 pages (2010).

Extended European Search Report issued by the European Patent Office for Application No. 12849587.6 dated Jul. 15, 2016 (13 pages).

Lu, Y., et al., "A Survey of Face Detection, Extraction and Recognition," Computing and Informatics, vol. 22, pp. 163-195 (2003).

Rahtu, E., et al., "Compressing Sparse Feature Vectors using Random Ortho-Projections," International Conference on Pattern Recognition, pp. 1397-1400 (2010).

\* cited by examiner

| 22 | 14 | 10 | 18 | 23 |
|----|----|----|----|----|
| 21 | 6  | 2  | 7  | 15 |
| 13 | 5  | 1  | 3  | 11 |
| 17 | 9  | 4  | 8  | 19 |
| 25 | 20 | 12 | 16 | 24 |

| 10 | 18 | 6  | 22 | 11 |
|----|----|----|----|----|
| 25 | 2  | 14 | 3  | 19 |
| 9  | 17 | 1  | 15 | 7  |
| 21 | 5  | 16 | 4  | 23 |
| 13 | 24 | 8  | 20 | 12 |

FIG. 11A

| 22 | 5  | 18 | 9  | 23 |
|----|----|----|----|----|
| 12 | 14 | 1  | 15 | 6  |
| 21 | 4  | 13 | 2  | 19 |
| 8  | 17 | 3  | 16 | 10 |
| 25 | 11 | 20 | 7  | 24 |

FIG. 11B

| SPECIFIED FEATURE DESCRIPTOR SIZE | NUMBER OF DIMENSIONS (NUMBER OF BITS) |
|---|---|
| 512 byte | 32 DIMENSIONS (32 BITS) |
| 1 Kbyte | 40 DIMENSIONS (40 BITS) |
| 2 Kbyte | 56 DIMENSIONS (56 BITS) |
| 4 Kbyte | 80 DIMENSIONS (80 BITS) |
| 8 Kbyte | 112 DIMENSIONS (112 BITS) |
| 16 Kbyte | 120 DIMENSIONS (120 BITS) |

FIG. 18

LOCAL FEATURE DESCRIPTOR EXTRACTING APPARATUS, LOCAL FEATURE DESCRIPTOR EXTRACTING METHOD, AND PROGRAM

CROSS-REFERENCE TO RELATED APPLICATIONS

This application is a national stage application of International Application No. PCT/JP2012/079673 entitled "Local Feature Amount Extraction Device, Local Feature Amount Extraction Method, and Program," filed on Nov. 15, 2012, which claims the benefit of the priority of Japanese Patent Application No. 2011-253223, filed on Nov. 18, 2011, the disclosures of each of which are hereby incorporated by reference in their entirety.

BACKGROUND

The present invention relates to a local feature descriptor extracting apparatus, a local feature descriptor extracting method, and a program.

To enable robust identification of an object in an image with respect to variations in photographed size and angle and to occlusion, systems are proposed which detect a large number of interest points (feature points) in the image and which extract a feature descriptor of a local region (a local feature descriptor) around each feature point. As representative systems thereof, Patent Document 1 and Non-Patent Document 1 disclose local feature descriptor extracting apparatuses that use a SIFT (Scale Invariant Feature Transform) feature descriptor.

FIG. 23 is a diagram showing an example of a general configuration of a local feature descriptor extracting apparatus that uses a SIFT feature descriptor. In addition, FIG. 24 is a diagram showing a conceptual image of SIFT feature descriptor extraction by the local feature descriptor extracting apparatus shown in FIG. 23.

As shown in FIG. 23, the local feature descriptor extracting apparatus includes a feature point detecting unit 200, a local region acquiring unit 210, a subregion dividing unit 220, and a subregion feature vector generating unit 230. The feature point detecting unit 200 detects a large number of interest points (feature points) from an image and outputs a coordinate position, a scale (size), and an orientation of each feature point. The local region acquiring unit 210 acquires a local region to be subjected to feature descriptor extraction from the coordinate position, the scale, and the orientation of each detected feature point. The subregion dividing unit 220 divides the local region into subregions. In the example shown in FIG. 24, the subregion dividing unit 220 divides the local region into 16 blocks (4×4 blocks). The subregion feature vector generating unit 230 generates a gradient direction histogram for each subregion of the local region. Specifically, the subregion feature vector generating unit 230 calculates a gradient direction for each pixel in each subregion and quantizes the gradient direction into eight directions. Moreover, the gradient direction that is calculated at this point is a relative direction with respect to an orientation of each feature point that is outputted by the feature point detecting unit 200. In other words, the gradient direction is a direction that is normalized with respect to an orientation outputted by the feature point detecting unit 200. In addition, the subregion feature vector generating unit 230 sums up frequencies of the eight quantized directions for each subregion and generates a gradient direction histogram. In this manner, gradient direction histograms of 16 blocks×8 directions that are generated with respect to each feature point are outputted as a 128-dimension local feature descriptor.

Furthermore, Patent Document 2 discloses a method of narrowing down calculation objects of local feature descriptor to feature points having a high reproducibility of extraction even when an image is subjected to rotation, enlargement, reduction, or the like in order to improve search accuracy and recognition accuracy when using a local feature descriptor.

Patent Document 1: U.S. Pat. No. 6,711,293
Patent Document 2: Patent Publication JP-A-2010-79545
Non-Patent Document 1: David G. Lowe, "Distinctive image features from scale-invariant keypoints", USA, International Journal of Computer Vision, 60 (2), 2004, pages 91-110

SUMMARY

The local feature descriptor described above has a problem in that a size thereof increases. For example, in the case of a SIFT feature descriptor, when a histogram value of each dimension is to be expressed by 1 byte, the SIFT feature descriptor requires a size of 128 dimensions×1 byte. In addition, with the methods disclosed in Patent Document 1 and Non-Patent Document 1, a local feature descriptor is generated with respect to all feature points extracted from an input image. Therefore, as the number of detected feature points increases, a size of the generated local feature descriptor also increases.

When the size of a local feature descriptor increases as described above, problems may occur when using the local feature descriptor to collate (match) images. For example, when a user terminal (for example, a mobile terminal equipped with a camera) extracts a local feature descriptor from an image and transmits the local feature descriptor to a server in order to search for an image similar to the image, communication time is prolonged if the size of the local feature descriptor is large. Therefore, a longer period of time is required until an image search result is obtained. In addition, when the size of the local feature descriptor is large, processing time for collating the local feature descriptor of the image increases. Furthermore, in a case of an image search using a local feature descriptor, a local feature descriptor of an image is to be stored on a memory. However, when the size of the local feature descriptor is large, the number of images whose local feature descriptor can be stored on the memory decreases. Therefore, a local feature descriptor is unsuitable for a large-scale search that targets a large amount of images.

In addition, with the method disclosed in Patent Document 2, although calculation objects of local feature descriptor can be narrowed down to feature points having a high reproducibility, problems similar to those that occur with the methods disclosed in Patent Document 1 and Non-Patent Document 1 occur when there are a large number of feature points having a high reproducibility.

In consideration thereof, an object of the present invention is to reduce a size of a feature descriptor while maintaining accuracy of object identification.

A local feature descriptor extracting apparatus according to an aspect of the present invention includes: a feature point detecting unit configured to detect a plurality of feature points in an image and output feature point information that is information regarding each feature point; a feature point selecting unit configured to select a prescribed number of feature points in an order of importance from the plurality of detected feature points, based on the feature point information; a local region acquiring unit configured to acquire a local region corresponding to each selected feature point; a subregion dividing unit configured to divide each local region into a plurality of subregions; a subregion feature vector generating unit configured to generate a feature vector of a plurality of dimensions for each subregion in each local region; and a dimension selecting unit configured to select a dimension from the feature vector for each subregion so that a correlation between neighboring subregions is lowered, based on a positional relationship between subregions in each local region and which outputs an element of the selected dimension as a feature descriptor of the local region.

In addition, in a local feature descriptor extracting method according to an aspect of the present invention, a computer is caused to: detect a plurality of feature points in an image and output feature point information that is information regarding each feature point; select a prescribed number of feature points in an order of importance from the plurality of detected feature points, based on the feature point information; acquire a local region corresponding to each selected feature point; divide each local region into a plurality of subregions; generate a feature vector of a plurality of dimensions for each subregion in each local region; and select a dimension from the feature vector for each subregion so that a correlation between neighboring subregions is lowered, based on a positional relationship between subregions in each local region, and output an element of the selected dimension as a feature descriptor of the local region.

Furthermore, a program according to an aspect of the present invention causes a computer to realize the functions of: detecting a plurality of feature points in an image and outputting feature point information that is information regarding each feature point; selecting a prescribed number of feature points in an order of importance from the plurality of detected feature points, based on the feature point information; acquiring a local region corresponding to each selected feature point; dividing each local region into a plurality of subregions; generating a feature vector of a plurality of dimensions for each subregion in each local region; and selecting a dimension from the feature vector for each subregion so that a correlation between neighboring subregions is lowered, based on a positional relationship between subregions in each local region, and outputting an element of the selected dimension as a feature descriptor of the local region.

Moreover, as used in the present invention, the term "unit" not only signifies physical means but also includes cases where functions of the "unit" are realized by software. In addition, functions of one "unit" or apparatus may be realized by two or more physical means or apparatuses, and functions of two or more "units" or apparatuses may be realized by one physical means or apparatus.

According to the present invention, a size of a feature descriptor can be reduced while maintaining accuracy of object identification.

DESCRIPTION OF DRAWINGS

FIG. 8 is a diagram showing an example of a priority order when selecting dimensions;

FIG. 10 is a diagram showing a configuration example of a local feature descriptor that is outputted according to a priority order;

FIG. 11 is a diagram showing an example of a priority order when selecting dimensions;

FIG. 18 is a diagram showing an example of a correspondence relationship between a specified feature descriptor size and the number of dimensions;

DETAILED DESCRIPTION

Hereinafter, embodiments of the present invention will be described with reference to the drawings.

First Embodiment

Figure 1:
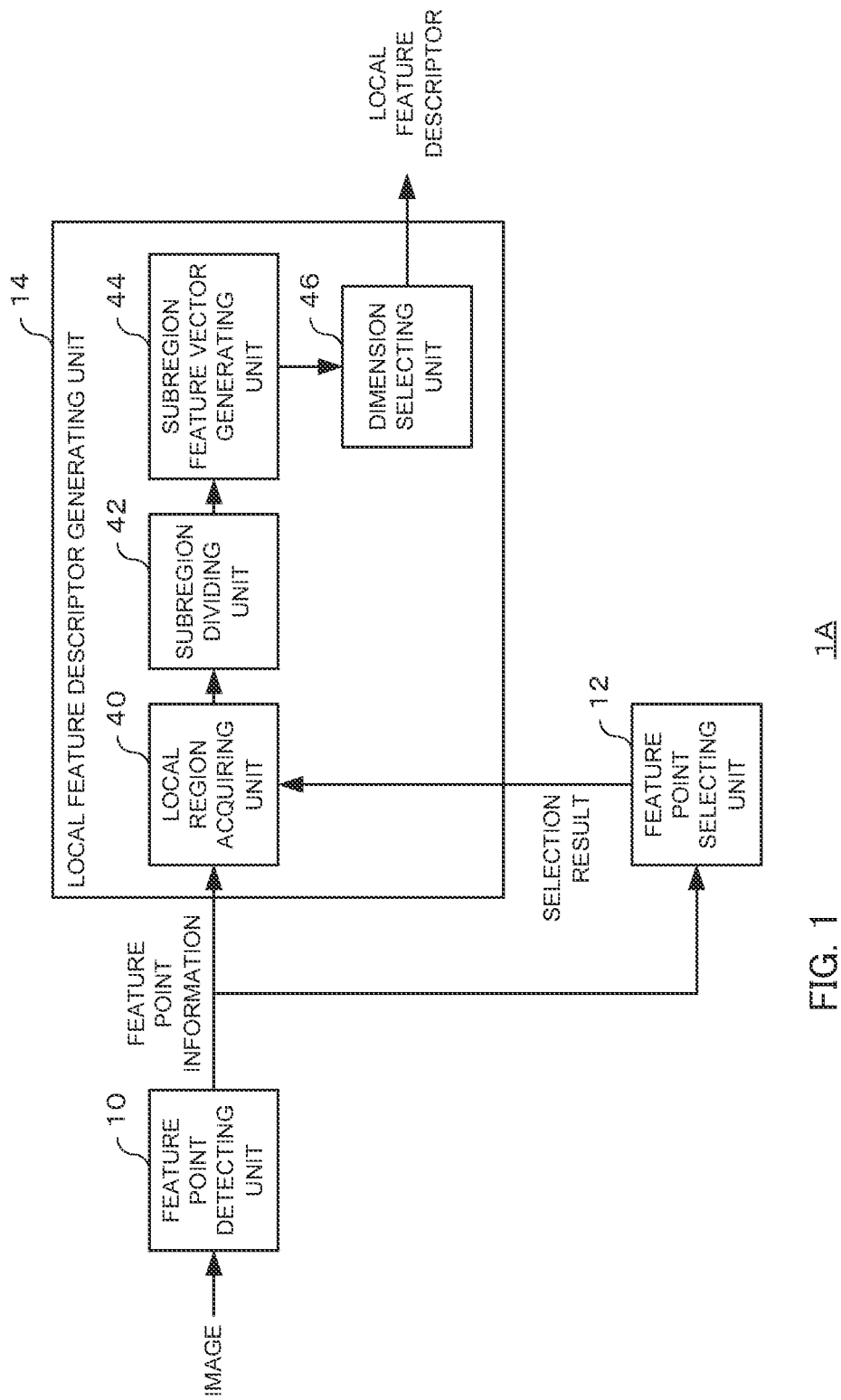
FIG. 1 is a diagram showing a configuration of a local feature descriptor extracting apparatus that is a first embodiment of the present invention.

FIG. 1 is a diagram showing a configuration of a local feature descriptor extracting apparatus that is a first embodiment of the present invention. A local feature descriptor extracting apparatus 1A is configured so as to include a feature point detecting unit 10, a feature point selecting unit 12, and a local feature descriptor generating unit 14. For example, the local feature descriptor extracting apparatus 1A can be configured using an information processing apparatus such as a personal computer or a mobile information terminal. In addition, for example, the respective units that constitute the local feature descriptor extracting apparatus 1A can be realized using a storage area such as a memory or by having a processor execute a program stored in the storage area. Moreover, components used in other embodiments described later can be realized in a similar manner.

The feature point detecting unit 10 detects a large number of interest points (feature points) from an image and outputs feature point information that is information related to each feature point. In this case, for example, feature point information refers to a coordinate position or a scale of a detected feature point, an orientation of a feature point, a "feature point number" that is a unique ID (Identification) assigned to a feature point, or the like.

Moreover, the feature point detecting unit 10 may output the feature point information as separate feature point information for each direction of an orientation of each feature point. For example, the feature point detecting unit 10 may be configured to output feature point information only with respect to a direction of a main orientation of each feature point or to also output feature point information with respect to directions of second and subsequent orientations. In addition, when the feature point detecting unit 10 is configured to also output feature point information with respect to directions of second and subsequent orientations, the feature point detecting unit 10 can attach a different feature point number to each direction of an orientation of each feature point.

Images used as objects of detection of a feature point may be any of a still image and a moving image (including short clips). Examples of images include an image taken by an imaging device such as a digital camera, a digital video camera, a mobile phone and an image captured through a scanner or the like.

In addition, images may be a compressed image such as a JPEG (Joint Photographic Experts Group) image or an uncompressed image such as a TIFF (Tagged Image File Format) image.

Furthermore, images may be a compressed moving image or a decoded compressed moving image. Moreover, when an image is a moving image, the feature point detecting unit 10 can detect a feature point for each of the frame images constituting the moving image. In addition, when an image is a compressed moving image, a compression format may be any decodable format such as MPEG (Moving Picture Experts Group), MOTION JPEG, and WINDOWS Media Video (WINDOWS and WINDOWS Media are registered trademarks).

For example, the feature point detecting unit 10 can use a DoG (Difference-of-Gaussian) process when detecting a feature point from an image and extracting feature point information. Specifically, the feature point detecting unit 10 can determine a position and a scale of a feature point by using a DoG process to perform an extreme value search in a scale space. Furthermore, the feature point detecting unit 10 can calculate an orientation of each feature point using a determined position and scale of a feature point and gradient information of a surrounding area. Moreover, the feature point detecting unit 10 may use other methods such as Fast-Hessian Detector instead of DoG to detect a feature point from an image and extract feature point information.

Based on the feature point information outputted from the feature point detecting unit 10, the feature point selecting unit 12 selects feature points of a specified number (predetermined number) in an order of importance from detected feature points. In addition, the feature point selecting unit 12 outputs information indicating a feature point number or an order of importance of the selected feature point as a selection result of the feature point.

For example, the feature point selecting unit 12 can hold specified number information that indicates a "specified number" of feature points to be selected. For example, the specified number information may be defined in a program or stored in a table or the like that is referenced by the program. In addition, the specified number information may be information indicating a specified number itself or information indicating a total size (for example, the number of bytes) of a local feature descriptor in an image. When the specified number information is information indicating a total size of a local feature descriptor in an image, for example, the feature point selecting unit 12 can calculate a specified number by dividing the total size by a size of a local feature descriptor at one feature point.

Figure 2:
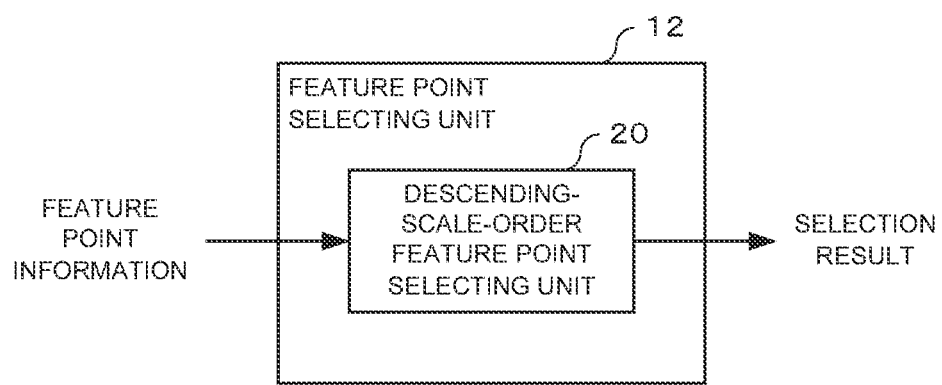
FIG. 2 is a diagram showing a configuration example of a feature point selecting unit.

Configuration examples of the feature point selecting unit 12 will now be described with reference to FIGS. 2 to 5. As shown in FIG. 2, the feature point selecting unit 12 may be configured so as to include a descending-scale-order feature point selecting unit 20. The descending-scale-order feature point selecting unit 20 is capable of selecting a specified number of feature points in a descending order of scale based on feature point information outputted from the feature point detecting unit 10.

Specifically, based on the feature point information, the descending-scale-order feature point selecting unit 20 sorts feature points in an order of scales of all feature points and assigns importance starting with the feature point with a largest scale. Subsequently, the descending-scale-order feature point selecting unit 20 selects feature points in a descending order of importance, and once the specified number of feature points has been selected, outputs information related to the selected feature points as a selection result. For example, the descending-scale-order feature point selecting unit 20 outputs a feature point number that is uniquely assigned to each feature point as the selection result.

Generally, feature points that are detected from an image are distributed in a large number in a small scale, and the greater the scale, the smaller the number of the detected feature points. Therefore, by selecting feature points in a descending order of scale, the descending-scale-order feature point selecting unit 20 can eventually select feature points across a wide range of scale. Due to such a selection of feature points across a wide range of scale, a fluctuation of a size of an object captured in an image can be broadly accommodated. As a result, the number of feature points to be objects of a feature point description can be reduced while hardly reducing accuracy of an application for image search, object detection, or the like.

Figure 3:
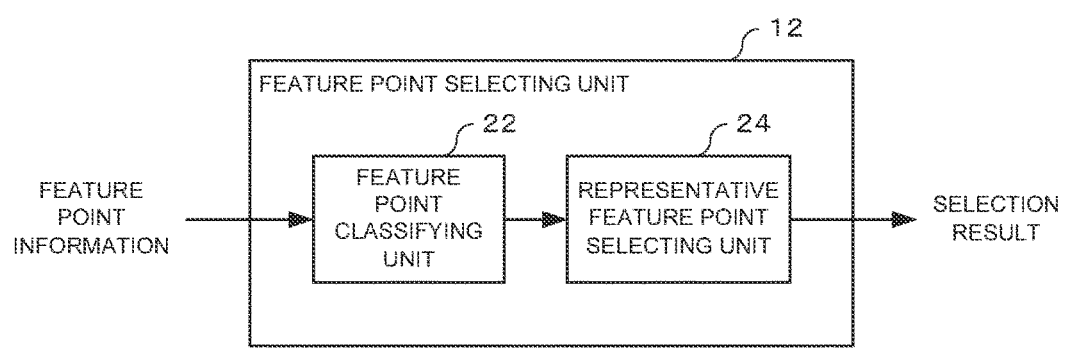
FIG. 3 is a diagram showing a configuration example of a feature point selecting unit.

As shown in FIG. 3, the feature point selecting unit 12 may be configured so as to include a feature point classifying unit 22 and a representative feature point selecting unit 24. Based on the feature point information, the feature point classifying unit 22 can classify a plurality of detected feature points into a plurality of groups. In addition, the representative feature point selecting unit 24 can select a specified number of feature points by selecting at least one feature point from each group.

Specifically, for example, the feature point classifying unit 22 uses information related to coordinate positions of feature points included in feature point information to calculate a density of feature points in a spatial direction. In addition, by grouping feature points whose coordinate positions are close and assigning a unique identifier to each group, the feature point classifying unit 22 can output information indicating an identifier of whichever group each feature point belongs to as spatial direction feature point density information.

By selecting a specified number of feature points based on the spatial direction feature point density information, the representative feature point selecting unit 24 can output information regarding the selected feature points as a selection result. For example, when receiving information indicating an identifier of whichever group each feature point belongs to as spatial direction feature point density information, the representative feature point selecting unit 24 may select a feature point with a largest scale among each group or select a most isolated feature point within each group (for example, a feature point having a largest sum of distances to all feature points belonging to the group).

In addition, the representative feature point selecting unit 24 may determine that a feature point selected from a group having a small number of feature points has a high importance and that a feature point selected from a group having a large number of feature points has a low importance.

Furthermore, when the number of feature points selected from each group is larger than the specified number, for example, the representative feature point selecting unit 24 may reduce the feature points down to the specified number based on importance and output information related to the selected feature points as a selection result. At this point, the representative feature point selecting unit 24 may select feature points in a descending order of importance.

On the other hand, when the number of feature points selected from each group is smaller than the specified number, for example, the representative feature point selecting unit 24 may further sequentially select one feature point from each group starting with the group with the smallest number of feature points.

Generally, feature points that are detected from an image tend to concentrate in a particular area in the image. Information retained by such feature points may contain redundancy. With the configuration shown in FIG. 3, by considering a density of feature points in a spatial direction, the representative feature point selecting unit 24 can select feature points evenly from an image. Therefore, the number of feature points to be objects of a feature point description can be reduced while hardly reducing accuracy of an application for image search, object detection, or the like.

Moreover, a method of classifying feature points is not limited to a method according to a density of feature points in a spatial direction. For example, in addition to the density of feature points in a spatial direction, the feature point classifying unit 22 may further classify feature points based on a similarity of orientations of feature points in a group. For example, the feature point classifying unit 22 may observe orientations of most adjacent feature points (feature points with nearest distances) among feature points in a group classified according to the density of feature points in a spatial direction, classify feature points into a same group if the orientations are extremely similar, and classify feature points into different groups if the orientations are not similar.

Moreover, instead of a two-stage process in which, after classifying feature points based on a density of feature points in a spatial direction, the feature points are classified based on orientations thereof, the feature point classifying unit 22 may classify feature points by simultaneously considering the density of feature points in a spatial direction and the similarity of orientations of the feature points.

Figure 4:
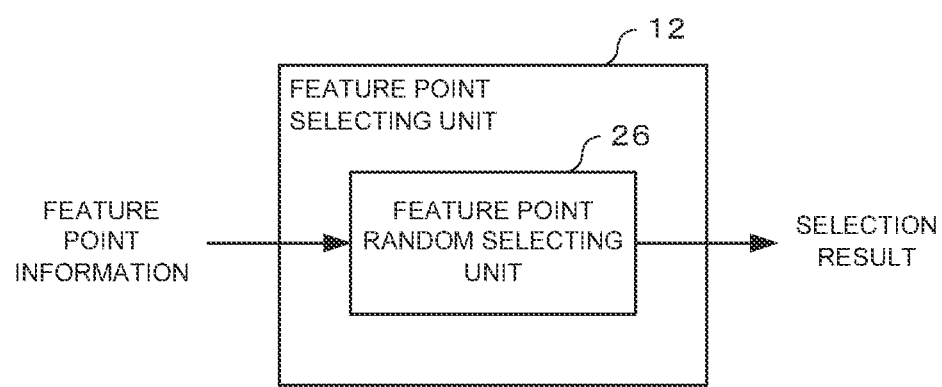
FIG. 4 is a diagram showing a configuration example of a feature point selecting unit.

As shown in FIG. 4, the feature point selecting unit 12 may be configured so as to include a feature point random selecting unit 26. The feature point random selecting unit 26 can randomly assign importance to the feature points and select feature points in a descending order of importance. In addition, once a specified number of feature points are selected, the feature point random selecting unit 26 can output information regarding the selected feature points as a selection result.

Generally, feature points that are detected from an image are distributed in a large number in a small scale, and the greater the scale, the smaller the number of the detected feature points. Therefore, due to the feature point random selecting unit 26 randomly assigning importance to all feature points and selecting feature points in a descending order of importance, ideally, feature points can be selected while retaining a shape of the distribution described earlier. As a result, feature points across a wide range of scale are selected and a fluctuation of a size of an object captured in an image can be broadly accommodated. Consequently, the number of feature points to be objects of a feature point description can be reduced while hardly reducing accuracy of an application for image search, object detection, or the like.

Figure 5:
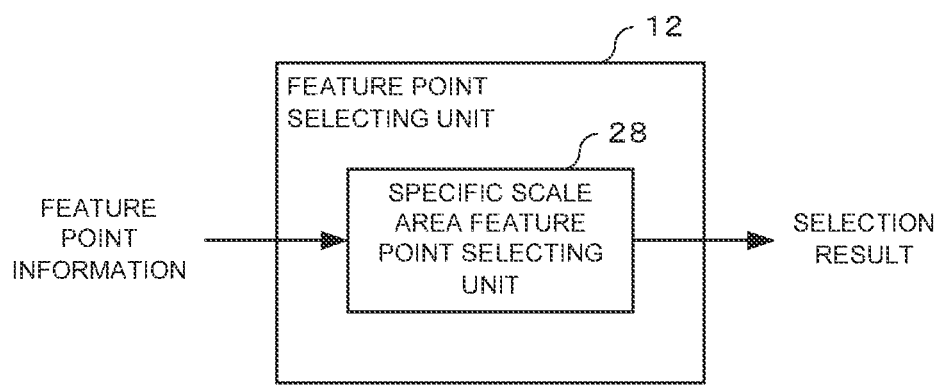
FIG. 5 is a diagram showing a configuration example of a feature point selecting unit.

As shown in FIG. 5, the feature point selecting unit 12 may be configured so as to include a specific scale area feature point selecting unit 28. Based on feature point information, the specific scale area feature point selecting unit 28 can select only feature points included in a particular scale area among the scales of all feature points.

In addition, when the number of selected feature points is larger than the specified number, for example, the specific scale area feature point selecting unit 28 may reduce the feature points down to the specified number based on importance and output information related to the selected feature points as a selection result. At this point, the specific scale area feature point selecting unit 28 may select feature points in a descending order of importance.

For example, the specific scale area feature point selecting unit 28 may determine that a feature point with a scale that is closer to a center of a scale area that is a selection object has higher importance and select feature points in an order of importance. Alternatively, the specific scale area feature point selecting unit 28 may determine that a feature point with a larger scale among a scale area that is a selection object has higher importance and select feature points in an order of importance.

On the other hand, when the number of feature points included in a particular scale area is smaller than the specified number, for example, the specific scale area feature point selecting unit 28 may determine that a feature point that is closer to the scale area has higher importance and newly select feature points in sequence from scale areas before and after the scale area.

With an application for image search, object detection, or the like, there may be cases where a size of an object in an image registered in a database is known and a size ratio of the captured object between a query-side image and the database-side image can be set. In such a case, if feature points with high importance among database-side feature points can be known, with respect to scales of such feature points, it is effective to intensively select feature points from a scale area that is subjected to correction corresponding to an object size ratio between the query-side image and the database-side image. Moreover, methods for discovering feature points with high importance among the database-side feature points are arbitrary. For example, an attention area in a database-side image may be specified in advance using a saliency map and feature points detected from the area may be defined so as to have high importance. Alternatively, for example, feature points with large scales may be defined so as to be important.

Returning now to FIG. 1, the local feature descriptor generating unit 14 receives feature point information outputted from the feature point detecting unit 10 and a selection result outputted from the feature point selecting unit 12. In addition, the local feature descriptor generating unit 14 generates (describes) a local feature descriptor that is a feature descriptor of a local region corresponding to each selected feature point. Moreover, the local feature descriptor generating unit 14 may output a local feature descriptor in a lossless compression format such as ZIP and LZH.

The local feature descriptor generating unit 14 can generate and output a local feature descriptor in an order of importance of feature points. Alternatively, the local feature descriptor generating unit 14 may generate and output a local feature descriptor in an order of coordinate positions of feature points. Moreover, due to generating a local feature descriptor in an order of importance of feature points, a matching process can be performed using only local feature descriptors of a part of feature points instead of using local feature descriptors of all of the selected feature points.

For example, when receiving information indicating an order of importance of the selected feature points and feature point number information thereof as a selection result, the local feature descriptor generating unit 14 can set a feature point corresponding to the feature point number as an object of feature point generation.

As shown in FIG. 1, the local feature descriptor generating unit 14 can be configured so as to include a local region acquiring unit 40, a subregion dividing unit 42, a subregion feature vector generating unit 44, and a dimension selecting unit 46.

Based on feature descriptor information, the local region acquiring unit 40 acquires a local region to be subjected to feature descriptor extraction from a coordinate position, a scale, and an orientation of each detected feature point. Moreover, when a plurality of pieces of feature point information with different orientations exist for one feature point, the local region acquiring unit 40 can acquire a local region with respect to each piece of feature point information.

Figure 24:
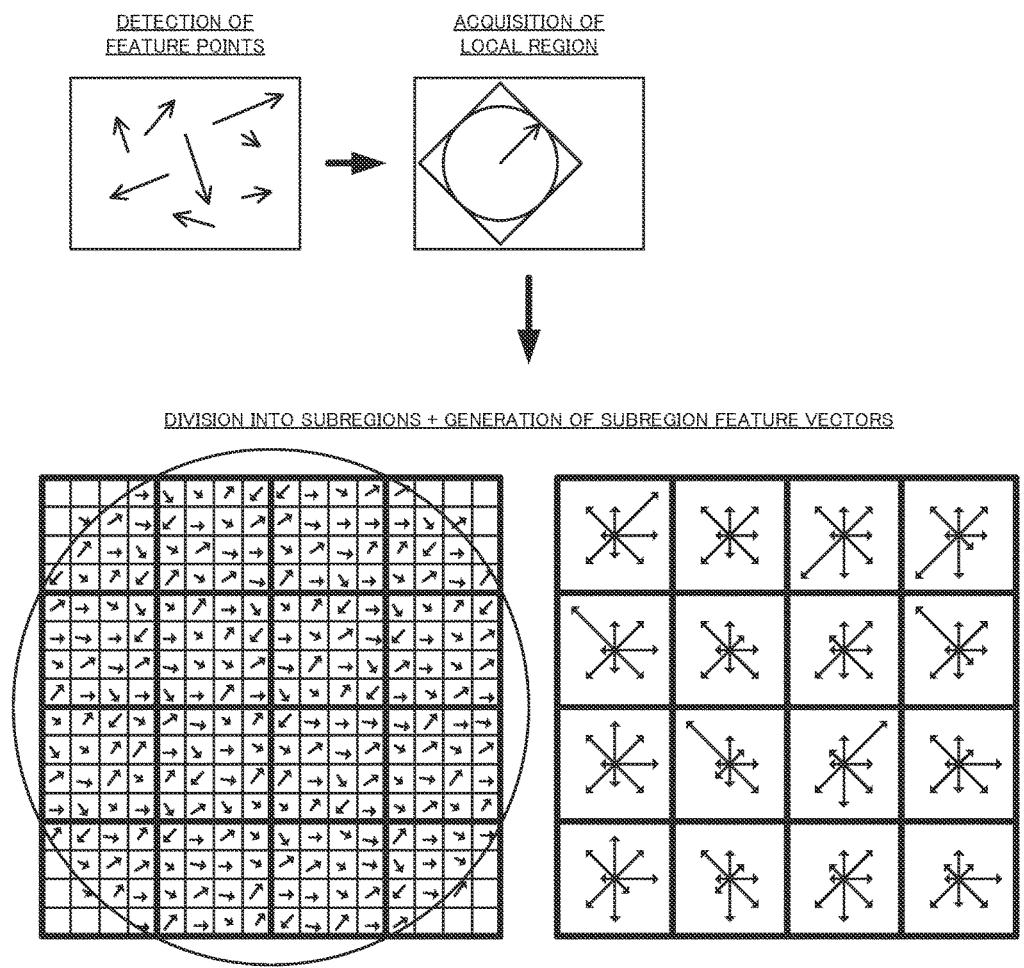
FIG. 24 is a diagram showing a conceptual image of extraction of a SIFT feature descriptor by a local feature descriptor extracting apparatus.

The subregion dividing unit 42 normalizes a local region by rotating the local region in accordance with an orientation direction of a feature point, and subsequently divides the local region into subregions. For example, as shown in FIG. 24, the subregion dividing unit 42 can divide a local region into 16 blocks (4×4 blocks). Alternatively, for example, the subregion dividing unit 42 can divide a local region into 25 blocks (5×5 blocks).

The subregion feature vector generating unit 44 generates a feature vector for each subregion of the local region. For example, a gradient direction histogram can be used as a feature vector of a subregion. Specifically, the subregion feature vector generating unit 44 calculates a gradient direction for each pixel in each subregion and quantizes the gradient direction into eight directions. The gradient direction that is calculated at this point is a relative direction with respect to an orientation of each feature point that is outputted by the feature point detecting unit 10. In other words, the gradient direction is a direction that is normalized with respect to the orientation outputted by the feature point detecting unit 10. In addition, the subregion feature vector generating unit 44 sums up frequencies of the eight quantized directions for each subregion and generates a gradient direction histogram. In this case, the subregion feature vector generating unit 44 outputs a feature vector constituted by a gradient direction histogram of 16 blocks×8 directions=128 dimensions that is generated with respect to each feature point. Alternatively, besides quantizing a gradient direction in eight directions, quantization may be performed in any quantization number such as 4 directions, 6 directions, and 10 directions. When a gradient direction is quantized in to D-number of directions, if the gradient direction prior to quantization is denoted by G (0 to 2 m radian), then a quantization value i (i=0, . . . , D−1) of the gradient direction can be calculated using, for example, Equation (1) or Equation (2). However, these equations are not restrictive and other equations may be used.

[Expression 1]

$$i = \mathrm{floor}\left(G \times \frac{D}{2\pi}\right) \quad (1)$$

[Expression 2]

$$i = \mathrm{round}\left(G \times \frac{D}{2\pi}\right) \mathrm{mod} D \quad (2)$$

In the equations above, floor ( ) denotes a function for truncating a fractional part, round ( ) denotes a rounding-off function, and mod denotes an operation for determining a remainder. In addition, when generating a gradient direction histogram, a sum may be calculated by adding a magnitude of gradients instead of simply summing up frequencies. Alternatively, when summing up a gradient direction histogram, a weight value may be added not only to a subregion to which a pixel belongs but also to a neighboring subregion (such as an adjacent block) depending on a distance between subregions. Alternatively, weight values may also be added in gradient directions before and after the quantized gradient direction. Moreover, a feature vector of a subregion is not limited to a gradient direction histogram and may be any information having a plurality of dimensions (elements) such as color information. The present embodiment will be described on the assumption that a gradient direction histogram is to be used as a feature vector of a subregion.

In addition, the subregion feature vector generating unit 44 can output a local feature descriptor so as to include coordinate position information of a feature point. Furthermore, the subregion feature vector generating unit 44 can output a local feature descriptor so as to include scale information of a selected feature point.

With an application for image search, object detection, or the like, when a same object is captured in a query (search requesting)-side image and a database-side image, a scale ratio of corresponding feature points between the images is approximately constant. Therefore, by including scale information in a local feature descriptor, matching accuracy of feature descriptors can be improved.

Based on a positional relationship between subregions, the dimension selecting unit 46 selects (thins) a dimension (element) to be outputted as a local feature descriptor so as to lower a correlation between feature vectors of neighboring subregions. More specifically, for example, the dimension selecting unit 46 selects a dimension so that at least one gradient direction differs between adjacent subregions. Moreover, while adjacent subregions are to be mainly used as neighboring subregions in the present embodiment, neighboring subregions are not limited to adjacent subregions and, for example, subregions within a predetermined distance from an object subregion may be considered neighboring subregions.

In addition, besides simply selecting a dimension, the dimension selecting unit 46 can determine a priority order of selection. In other words, for example, the dimension selecting unit 46 can select a dimension by applying a priority order so that a dimension with a same gradient direction is not selected between adjacent subregions. Furthermore, the dimension selecting unit 46 outputs a feature vector constituted by selected dimensions as a local feature descriptor. Moreover, the dimension selecting unit 46 can output a local feature descriptor in a state where dimensions are sorted based on a priority order.

Figure 6:
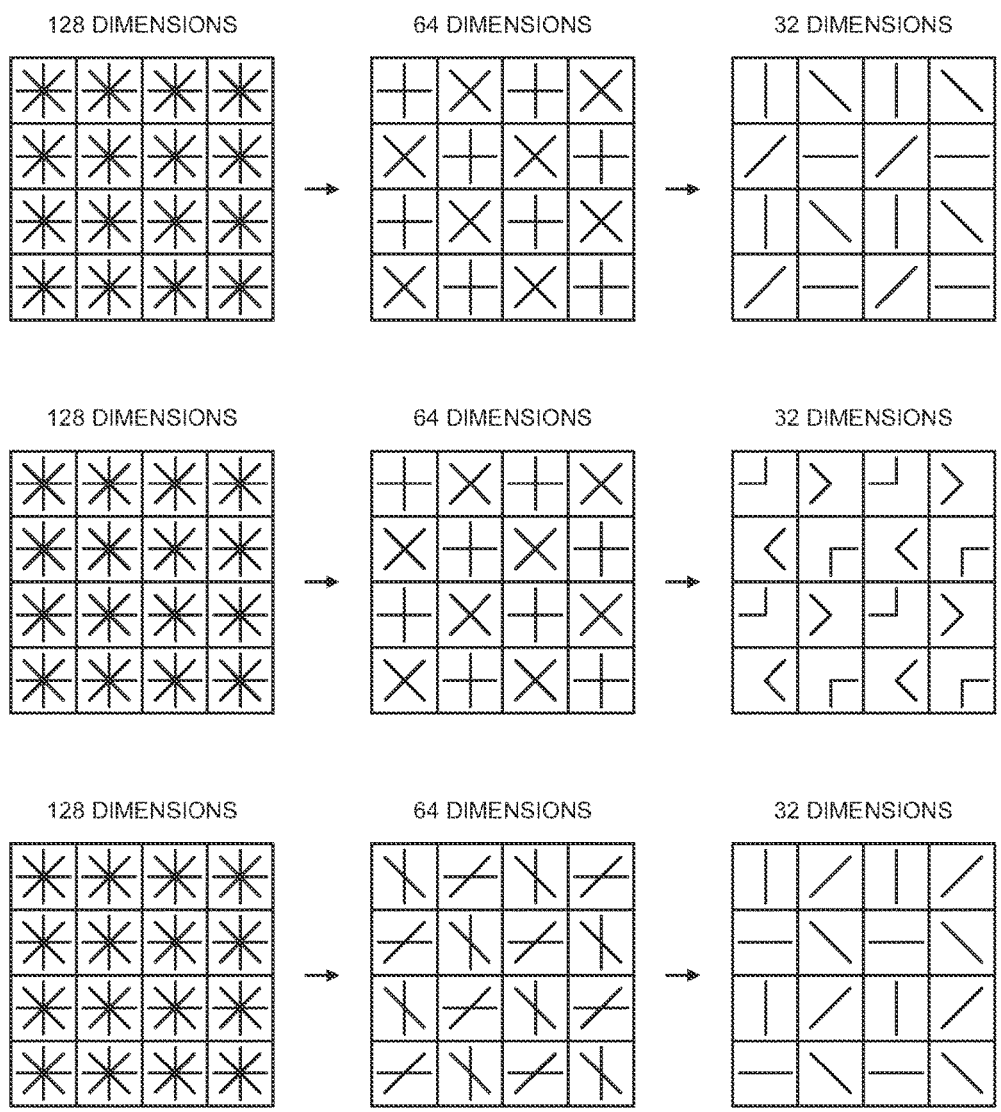
FIG. 6 is a diagram showing an example of a case where dimensions are selected from a 128-dimension feature vector.

Specific examples of dimension selection by the dimension selecting unit 46 will now be described with reference to FIGS. 6 to 10. FIG. 6 is a diagram showing an example in which a local region is divided into subregions of 4×4 blocks and a dimension is selected from a feature vector of a 128-dimension gradient direction histogram that is generated by quantizing a gradient direction in eight directions. In the example shown in FIG. 6, a dimension is selected from a 128-dimension (4×4=16 blocks×8 directions) feature vector that is similar to a SIFT feature descriptor.

As shown in FIG. 6, when selecting 64 dimensions that is half of the dimensions from 128 dimensions, the dimension selecting unit 46 can select a dimension so that a dimension with a same gradient direction is not selected for upper and lower blocks (subregions) or left and right blocks (subregions) that are adjacent to one another. FIG. 6 shows an example where, when a quantized gradient direction of a gradient direction histogram is denoted by i (i=0, 1, 2, 3, 4, 5, 6, 7), a block in which elements of i=0, 2, 4, 6 are selected and a block in which elements of i=1, 3, 5, 7 are selected are alternately arranged. In addition, as another example, FIG. 6 shows an example where a block in which elements of i=0, 3, 4, 7 are selected and a block in which elements of i=1, 2, 5, 6 are selected are alternately arranged. Furthermore, in the examples shown in FIG. 6, the gradient directions (dimensions) selected between adjacent blocks add up to a total of eight directions. In other words, a relationship exists in which a feature descriptor is mutually complemented between adjacent blocks.

In addition, as shown in FIG. 6, when selecting 32 dimensions, the dimension selecting unit 46 can select the dimensions so that a dimension with a same gradient direction is not selected between blocks positioned at an oblique 45 degrees. Furthermore, in the example shown in FIG. 6, the gradient directions (dimensions) selected among 2×2 adjacent blocks add up to a total of eight directions. In other words, even in this case, a relationship exists in which a feature descriptor is mutually complemented between adjacent blocks.

As described above, dimensions are desirably selected so that gradient directions do not overlap each other between adjacent blocks and that all gradient directions are evenly selected. In addition, at the same time, dimensions are desirably selected evenly from an entire local region, as shown in FIG. 6. Moreover, the dimension selection methods shown in FIG. 6 are merely examples and selection methods are not limited thereto.

Figure 7:
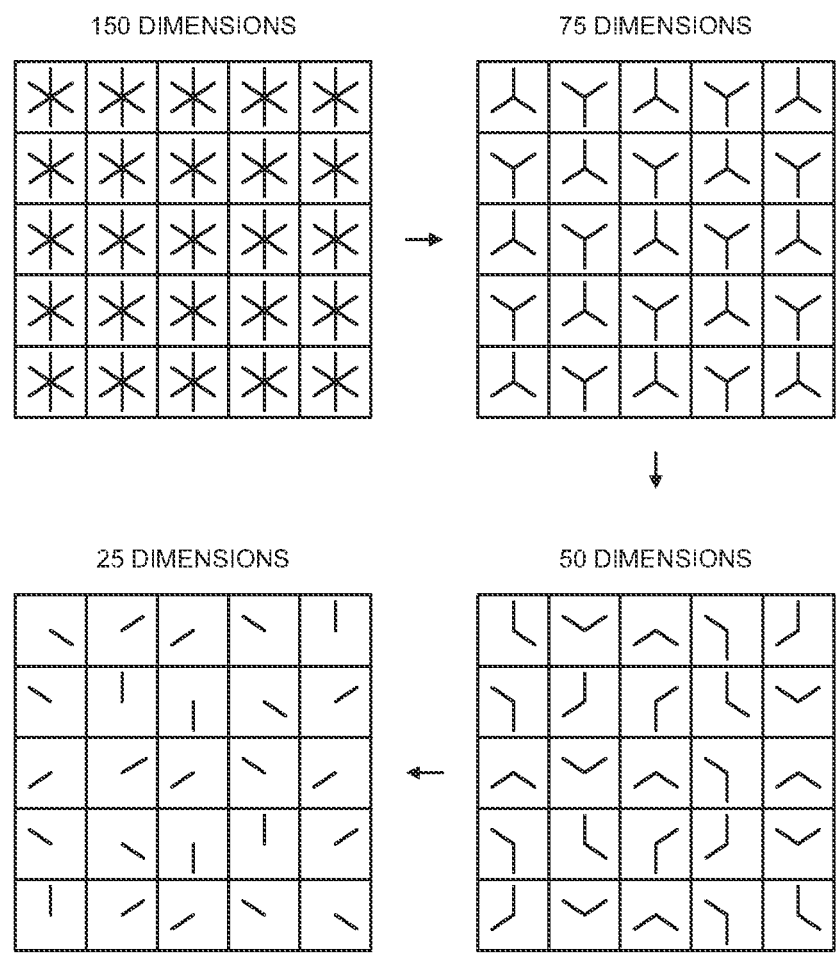
FIG. 7 is a diagram showing another example of dimension selection.

FIG. 7 is a diagram showing another example of dimension selection. In the example shown in FIG. 7, the subregion dividing unit 42 divides a local region into subregions of 5×5=25 blocks and the subregion feature vector generating unit 44 generates a gradient direction histogram of six directions from each subregion. In other words, as shown in FIG. 7, a feature vector generated by the subregion feature vector generating unit 44 has 150 dimensions.

As shown in FIG. 7, when selecting 75 dimensions that is half of the dimensions from 150 dimensions, the dimension selecting unit 46 can select dimensions so that a dimension with a same gradient direction is not selected for upper and lower blocks or left and right blocks that are adjacent to one another. In this example, when a quantized gradient direction of a gradient direction histogram is denoted by i (i=0, 1, 2, 3, 4, 5), a block in which elements of i=0, 2, 4 are selected and a block in which elements of i=1, 3, 5 are selected are alternately arranged. Furthermore, in the examples shown in FIG. 7, the gradient directions selected between adjacent blocks add up to a total of six directions.

In addition, when selecting 50 dimensions from 75 dimensions, the dimension selecting unit 46 can select dimensions so that only one direction is the same (the remaining one direction is different) between blocks positioned at an oblique 45 degrees. Furthermore, when selecting 25 dimensions from 50 dimensions, the dimension selecting unit 46 can select dimensions so that selected gradient directions are not consistent between blocks positioned at an oblique 45 degrees. In the example shown in FIG. 7, the dimension selecting unit 46 selects one gradient direction from each subregion for 1 to 25 dimensions, selects two gradient directions for 26 to 50 dimensions, and selects three gradient directions for 51 to 75 dimensions.

Figure 9:
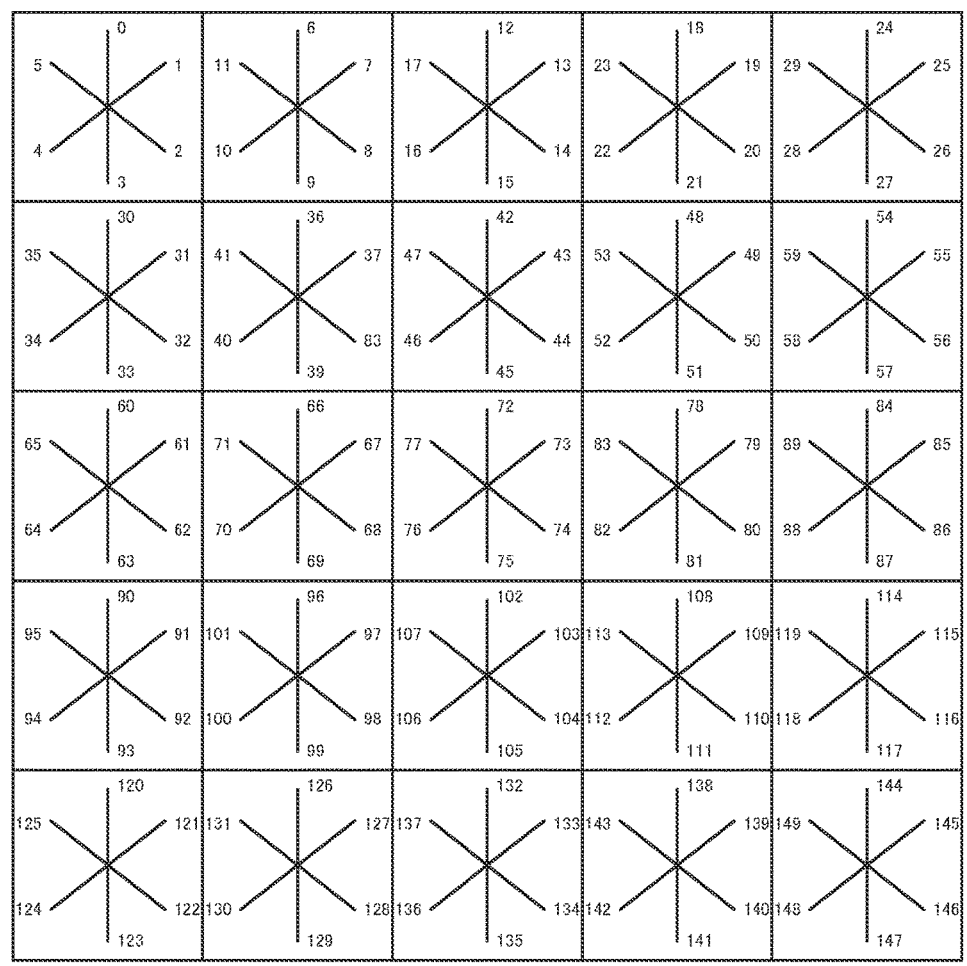
FIG. 9 is a diagram showing an example of a priority order of dimensions of a gradient direction histogram.

In addition, for example, the dimension selecting unit 46 may select dimensions for 1 to 25 dimensions, 26 to 50 dimensions, and 51 to 75 dimensions so as to add dimensions in an order of blocks such as that shown in FIG. 8. When using the priority order shown in FIG. 8, the dimension selecting unit 46 can select gradient directions by giving a block close to center a high priority order. FIG. 9 is a diagram showing an example of numbers of elements of a 150-dimension feature vector. In this example, if 5×5=25 blocks are denoted in a raster-scanning order by a number b (b=0, 1, . . . , 25) and a quantized gradient direction is denoted by i (i=0, 1, 2, 3, 4, 5), then a number of an element of a feature vector is expressed as 6×b+i.

Figure 10:
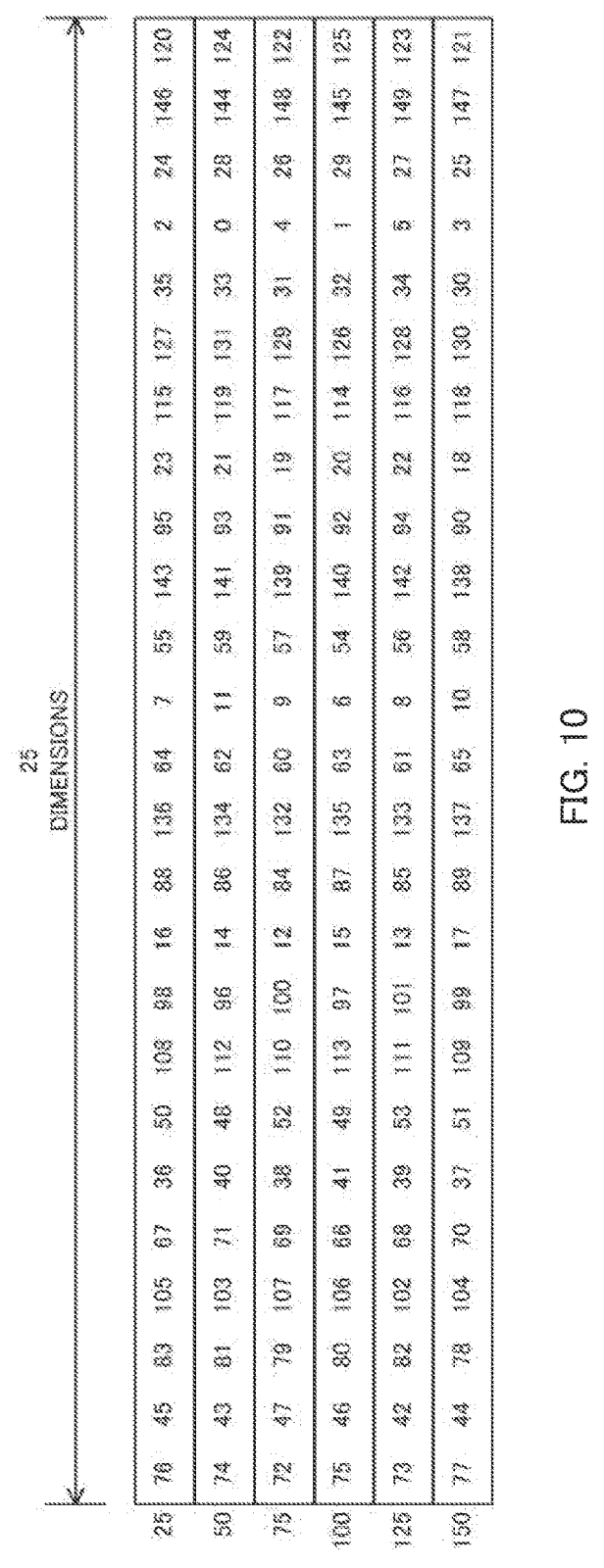

Furthermore, FIG. 10 is a diagram showing a configuration example of a local feature descriptor that is obtained by selecting elements shown in FIG. 9 according to the priority order shown in FIG. 8. For example, the dimension selecting unit 46 can output dimensions (elements) in an order shown in FIG. 10. Specifically, for example, when outputting a local feature descriptor of 150 dimensions, the dimension selecting unit 46 can output elements of all 150 dimensions in the order shown in FIG. 10. In addition, for example, when outputting a 25-dimension local feature descriptor, the dimension selecting unit 46 can output elements of a first row (76th, 45th, 83rd, . . . , 120th elements) shown in FIG. 10 in an order (from left to right) shown in FIG. 10. Furthermore, for example, when outputting a 50-dimension local feature descriptor, the dimension selecting unit 46 can output elements of a second row shown in FIG. 10 in addition to the first row shown in FIG. 10 in the order (from left to right) shown in FIG. 10.

In the example shown in FIG. 10, a local feature descriptor has a hierarchical structure. In other words, for example, between a 25-dimension local feature descriptor and a 150-dimension local feature descriptor, arrangements of elements of a local feature descriptor corresponding to the first 25 dimensions are the same. As shown, by selecting dimensions hierarchically (progressively), the dimension selecting unit 46 can extract and output a local feature descriptor of an arbitrary number of dimensions or, in other words, a local feature descriptor of an arbitrary size in accordance with applications, communication capacity, terminal specifications, or the like. In addition, due to the dimension selecting unit 46 selecting dimensions hierarchically and outputting the dimensions after sorting the dimensions based on a priority order, image matching can be performed using local feature descriptors with different numbers of dimensions. For example, when image matching is performed using a 75-dimension local feature descriptor and a 50-dimension local feature descriptor, a calculation of a distance between the local feature descriptors can be performed using only the first 50 dimensions.

Moreover, the priority orders shown in FIGS. 8 to 10 are simply examples and an order that is applied when selecting dimensions is not limited thereto. For example, regarding an order of blocks, orders shown in FIGS. 11A and 11B may be applied instead of the example shown in FIG. 8. In addition, for example, a priority order may be set so that dimensions are evenly selected from all subregions. Alternatively, on the assumption that a vicinity of a center of a local region is important, a priority order may be set so that selection frequency is high in subregions in the vicinity of the center. Furthermore, for example, information indicating a selection order of dimensions may be defined in a program or stored in a table or the like (a selection order storing unit) that is referenced by the program upon execution.

Figure 12A:
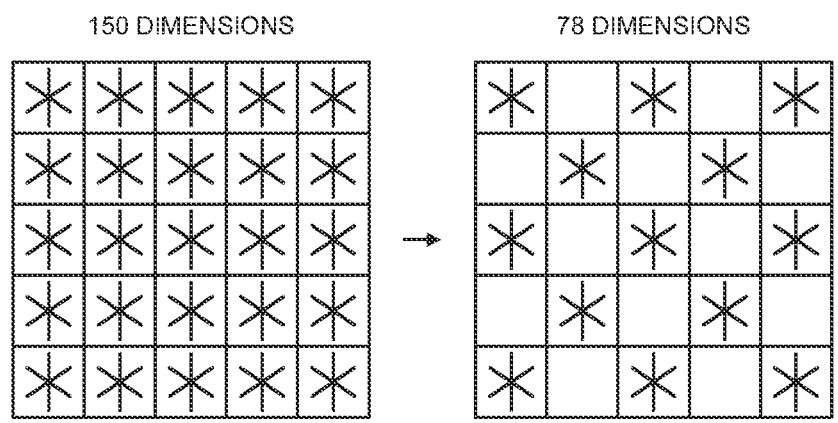
FIG. 12 is a diagram showing another example of dimension selection.
Figure 12B:
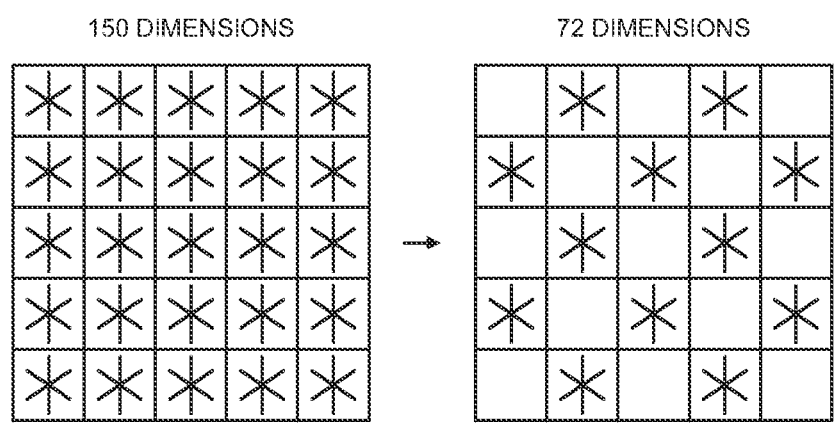

Alternatively, the dimension selecting unit 46 may perform selection such as those shown in FIGS. 12A and 12B. In this case, six dimensions are selected in a given subregion and zero dimensions are selected in another subregion that is adjacent to the given subregion. Even in such a case, it is safe to say that dimensions are selected for each subregion so that a correlation between neighboring subregions is lowered.

Figure 13:
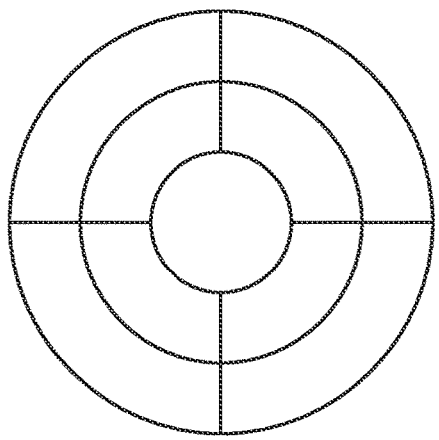
FIG. 13 is a diagram showing an example of a circular local region.
Figure 13:
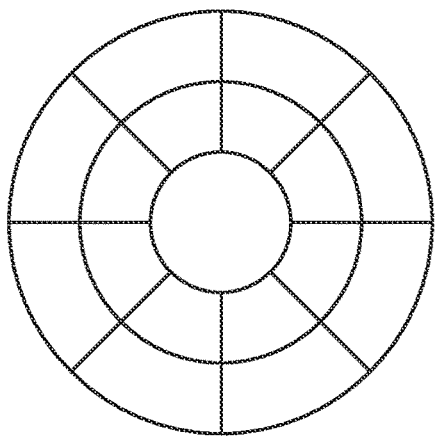
Figure 14:
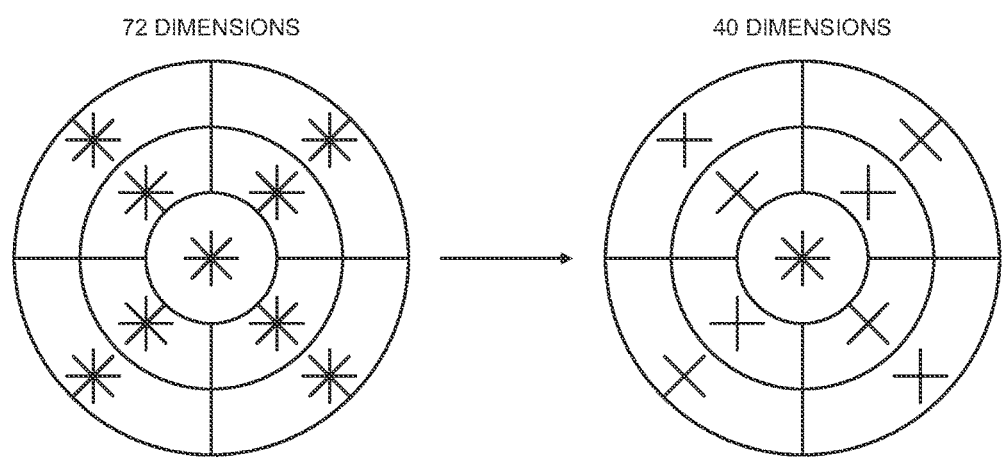
FIG. 14 is a diagram showing an example of dimension selection in a circular local region.

In addition, shapes of a local region and a subregion are not limited to a square such as those shown in FIGS. 6 and 7 and may be an arbitrary shape. For example, as shown in FIG. 13, the local region acquiring unit 40 may be configured so as to acquire a circular local region. In this case, as shown in FIG. 13, for example, the subregion dividing unit 42 can divide the circular local region into 9 subregions or 17 subregions. Even in this case, for example, the dimension selecting unit 46 can select dimensions in each subregion as shown in FIG. 14. Moreover, in the example shown in FIG. 14, thinning of dimensions is not performed in central subregions when selecting 40 dimensions from 72 dimensions.

Figure 15:
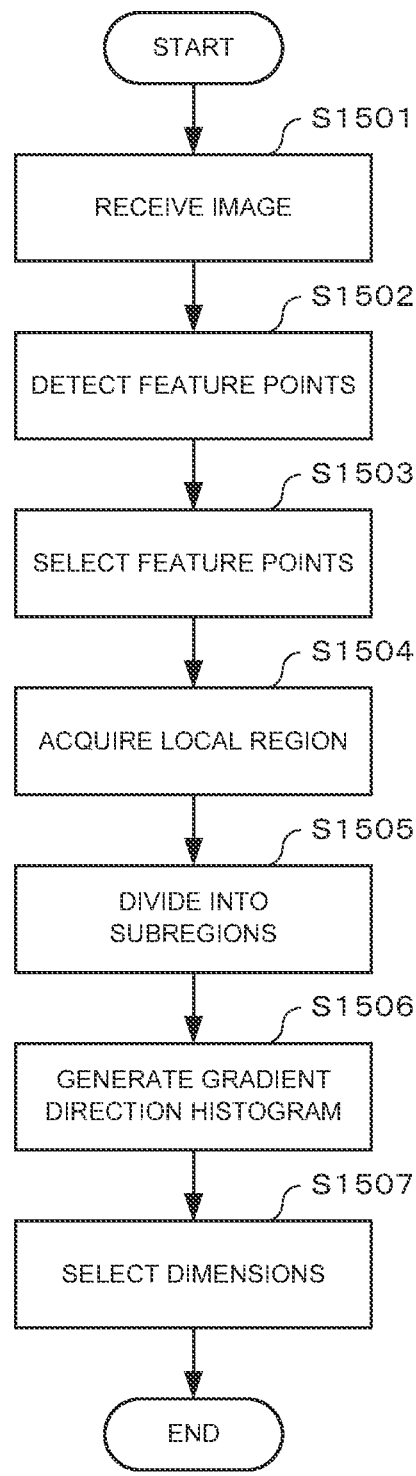
FIG. 15 is a flow chart showing an example of processing by a local feature descriptor extracting apparatus.

FIG. 15 is a flow chart showing an example of processing by the local feature descriptor extracting apparatus 1A. First, the feature point detecting unit 10 receives an image to be an object of local feature descriptor generation (S1501). The feature point detecting unit 10 detects a feature point from the received image and outputs feature point information including a coordinate position and a scale of the feature point, an orientation of the feature point, and a feature point number (S1502). In addition, based on the feature point information, the feature point selecting unit 12 selects a specified number of feature points in an order of importance from the detected feature points and outputs a selection result thereof (S1503).

Subsequently, based on a coordinate value, a scale, and an orientation of each selected feature point, the local region acquiring unit 40 acquires a local region to be subjected to feature descriptor extraction (S1504). In addition, the subregion dividing unit 42 divides the local region into subregions (S1505). The subregion feature vector generating unit 44 generates a gradient direction histogram for each subregion of the local region (S1506). Finally, the dimension selecting unit 46 selects a dimension (element) to be outputted as a local feature descriptor according to a set selection order (S1507).

As described above, with the local feature descriptor extracting apparatus 1A according to the first embodiment, based on a positional relationship among subregions, the dimension selecting unit 46 selects a dimension (element) to be outputted as a local feature descriptor so that a correlation between neighboring subregions is lowered. In other words, since neighboring subregions often have a high correlation, the dimension selecting unit 46 can select a dimension so that a dimension (element) of a same feature vector is not selected from a neighboring subregion. Accordingly, a size of a feature descriptor can be reduced while maintaining accuracy of object identification.

In addition, the dimension selecting unit 46 can hierarchically (progressively) output local feature descriptors as illustrated in FIG. 10. Accordingly, even between local feature descriptors with different numbers of selected dimensions (sizes of feature descriptors), mutual matching (distance calculation) can be performed.

Furthermore, since the dimension selecting unit 46 performs dimension selection based on a positional relationship among subregions, learning need not be performed when selecting dimensions. In other words, generic local feature descriptor extraction can be performed without being dependent on data (image).

In addition, with the local feature descriptor extracting apparatus 1A, based on feature point information, the feature point selecting unit 12 selects a prescribed number of feature points in an order of importance from a plurality of detected feature points. Furthermore, the local feature descriptor generating unit 14 generates a local feature descriptor with respect to each selected feature point. Accordingly, a size of the local feature descriptors can be reduced as compared to a case where a local feature descriptor is generated for all detected feature points. In other words, the size of the local feature descriptors can be controlled to a size corresponding to the specified number. Moreover, since feature points to be objects of local feature descriptor generation are selected in an order of importance, an accuracy of object identification can be maintained. In addition, due to a reduced local feature descriptor size, communication time and processing time can be reduced when performing an image search using the local feature descriptor.

Moreover, in the local feature descriptor extracting apparatus 1A, an order of processes performed by the subregion feature vector generating unit 44 and the dimension selecting unit 46 may be switched. In other words, with the local feature descriptor extracting apparatus 1A, after dimensions are selected by the dimension selecting unit 46, a feature vector may be generated with respect to a selected dimension by the subregion feature vector generating unit 44.

Second Embodiment

Figure 16:
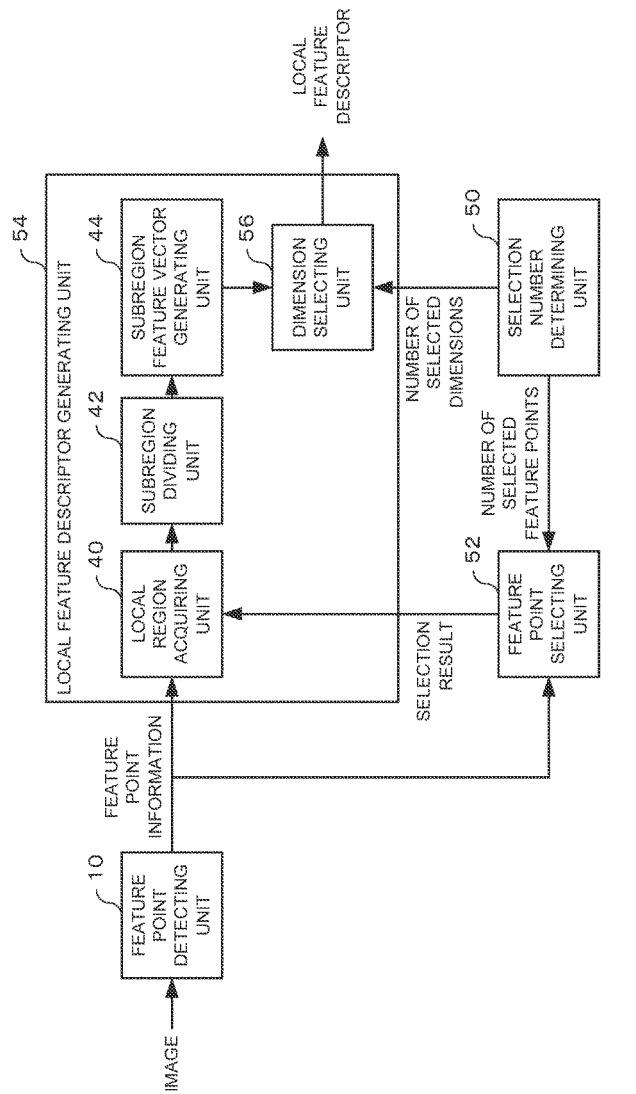
FIG. 16 is a diagram showing a configuration of a local feature descriptor extracting apparatus according to a second embodiment of the present invention.

Next, a second embodiment will be described. FIG. 16 is a diagram showing a configuration of a local feature descriptor extracting apparatus according to a second embodiment of the present invention. As shown in FIG. 16, a local feature descriptor extracting apparatus 1B is configured so as to include a feature point detecting unit 10, a selection number determining unit 50, a feature point selecting unit 52, and a local feature descriptor generating unit 54. In addition, the local feature descriptor generating unit 54 is configured so as to include a local region acquiring unit 40, a subregion dividing unit 42, a subregion feature vector generating unit 44, and a dimension selecting unit 56. As shown, with the local feature descriptor extracting apparatus 1B, the selection number determining unit 50 has been added to the local feature descriptor extracting apparatus 1A according to the first embodiment. In addition, with the local feature descriptor extracting apparatus 1B, the feature point selecting unit 12 and the dimension selecting unit 46 of the local feature descriptor extracting apparatus 1A according to the first embodiment have been replaced by the feature point selecting unit 52 and the dimension selecting unit 56. Moreover, same components as in the first embodiment are assigned the same reference symbols and descriptions thereof will be omitted.

The selection number determining unit 50 can determine the number of feature points to be selected by the feature point selecting unit 52 (the number of selected feature points) and the number of dimensions to be selected by the dimension selecting unit 56 (the number of selected dimensions). For example, by receiving information indicating the number of feature points and the number of dimensions from a user, the selection number determining unit 50 can determine the number of feature points and the number of dimensions. Moreover, the information indicating the number of feature points and the number of dimensions need not necessarily indicate the number of feature points and the number of dimensions themselves and may be, for example, information indicating a search accuracy and a search speed. Specifically, for example, when receiving an input requesting an increase in search accuracy, the selection number determining unit 50 may be configured so as to determine the number of feature points and the number of dimensions so that at least one of the number of feature points and the number of dimensions is increased. In addition, for example, when receiving an input requesting an increase in search speed, the selection number determining unit 50 may be configured so as to determine the number of feature points and the number of dimensions so that at least one of the number of feature points and the number of dimensions is reduced.

Furthermore, for example, the selection number determining unit 50 may be configured so as to determine the number of feature points and the number of dimensions based on an application for which the local feature descriptor extracting apparatus 1B is used, a communication capacity of the local feature descriptor extracting apparatus 1B, processing specifications of a terminal, or the like. Specifically, for example, when the communication capacity is small (communication speed is low), the selection number determining unit 50 may be configured so as to determine the number of feature points and the number of dimensions so that at least one of the number of feature points and the number of dimensions is reduced as compared to a case where the communication capacity is large (communication speed is high). Alternatively, for example, when the processing specifications of a terminal is low, the selection number determining unit 50 may be configured so as to determine the number of feature points and the number of dimensions so that at least one of the number of feature points and the number of dimensions is reduced as compared to a case where the processing specifications is high. Alternatively, for example, the selection number determining unit 50 may be configured so as to dynamically determine the number of feature points and the number of dimensions in accordance with a processing load on a terminal.

Based on the number of feature points determined by the selection number determining unit 50, the feature point selecting unit 52 can select a feature point in a similar manner to the feature point selecting unit 12 according to the first embodiment.

Based on the number of dimensions determined by the selection number determining unit 50, the dimension selecting unit 56 can select a dimension of a feature vector in a similar manner to the dimension selecting unit 46 according to the first embodiment and output the dimension as a local feature descriptor.

As described above, with the local feature descriptor extracting apparatus 1B according to the second embodiment, the selection number determining unit 50 can determine the number of feature points to be selected by the feature point selecting unit 52 and the number of dimensions to be selected by the dimension selecting unit 56. Accordingly, an appropriate number of feature points and an appropriate number of dimensions can be determined based on a user input, communication capacity, processing specifications of a terminal, or the like. As a result, a size of a feature descriptor can be controlled to a desired size while maintaining accuracy of object identification.

Third Embodiment

Figure 17:
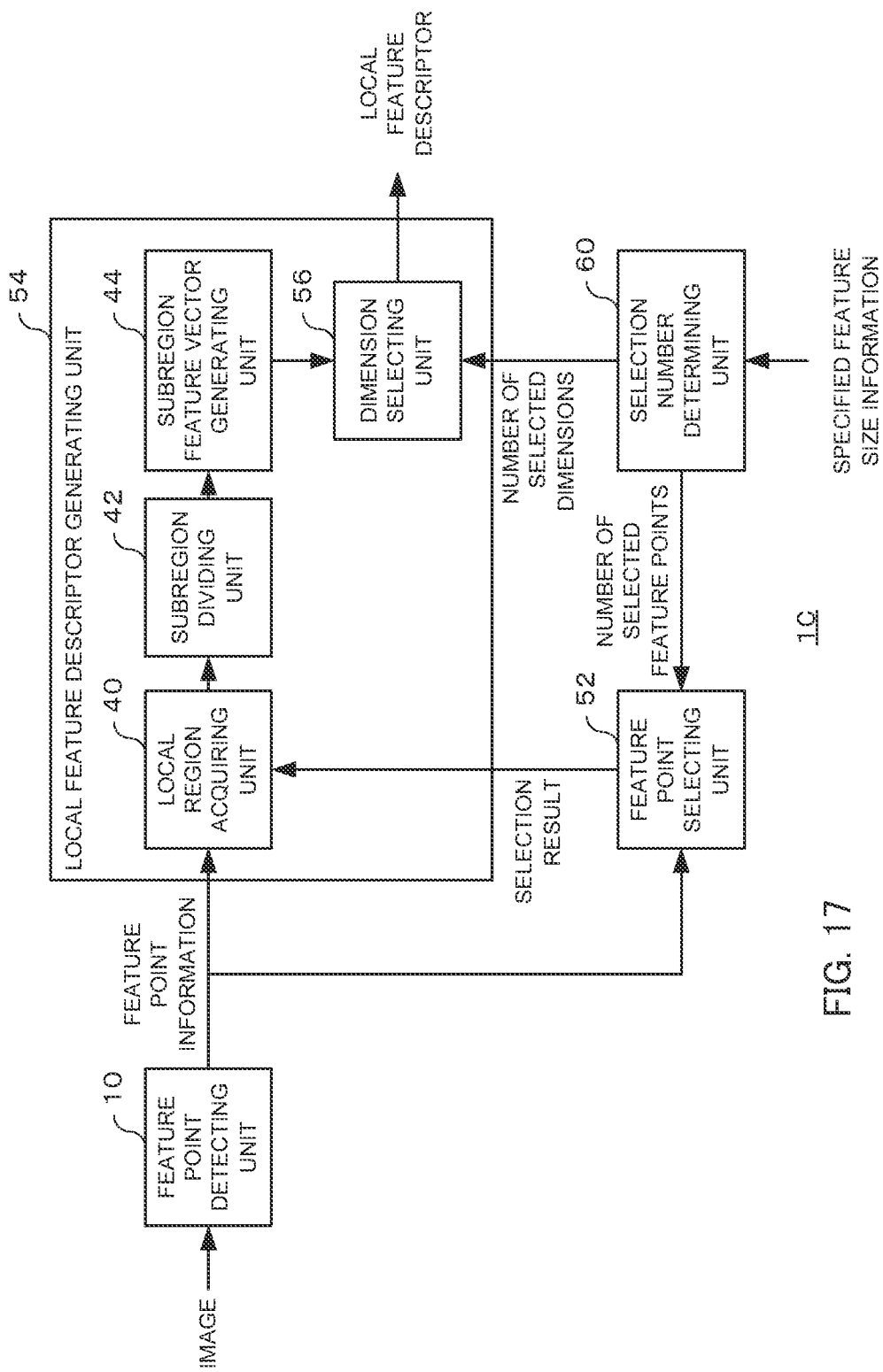
FIG. 17 is a diagram showing a configuration of a local feature descriptor extracting apparatus according to a third embodiment of the present invention.

Next, a third embodiment will be described. FIG. 17 is a diagram showing a configuration of a local feature descriptor extracting apparatus according to a third embodiment of the present invention. As shown in FIG. 17, a local feature descriptor extracting apparatus 1C is configured so as to include a feature point detecting unit 10, a selection number determining unit 60, a feature point selecting unit 52, and a local feature descriptor generating unit 54. In addition, the local feature descriptor generating unit 54 is configured so as to include a local region acquiring unit 40, a subregion dividing unit 42, a subregion feature vector generating unit 44, and a dimension selecting unit 56. As shown, with the local feature descriptor extracting apparatus 1C, the selection number determining unit 50 of the local feature descriptor extracting apparatus 1B according to the second embodiment has been replaced by the selection number determining unit 60. Moreover, same components as in the second embodiment are assigned the same reference symbols and descriptions thereof will be omitted.

Based on specified feature descriptor size information that is information for specifying a size (total size) of feature descriptors of an entire image, the selection number determining unit 60 can determine the number of feature points and the number of dimensions so that a size of feature descriptors of an entire image equals a specified feature descriptor size.

First, a pattern in which the number of dimensions is first determined will be described. For example, the selection number determining unit 60 can determine the number of dimensions based on information defining a correspondence relationship between a specified feature descriptor size and the number of dimensions. FIG. 18 shows an example of information defining a correspondence relationship between the specified feature descriptor size and the number of dimensions. By referring to information such as that shown in FIG. 18, the selection number determining unit 60 can determine the number of dimensions that corresponds to the specified feature descriptor size. Moreover, while the selected number of dimensions increases as the specified feature descriptor size increases in the correspondence relationship shown in FIG. 18, a correspondence relationship is not limited thereto. For example, a correspondence relationship in which a fixed number of dimensions are associated regardless of the specified feature descriptor size may be adopted. Moreover, for example, the information defining a correspondence relationship may be defined in a program or stored in a table or the like that is referenced by the program.

In addition, based on the specified feature descriptor size and the determined number of dimensions, the selection number determining unit 60 can determine the number of selected feature points so that a feature descriptor size equals the specified feature descriptor size. Moreover, when the local feature descriptor generating unit 54 outputs a feature descriptor so as to include additional information such as a coordinate position of a feature point, the selection number determining unit 60 can determine the number of feature points so that a feature descriptor size including a description size of the additional information equals the specified feature descriptor size.

Furthermore, the selection number determining unit 60 can also once again determine the number of dimensions based on a selection result of the feature point selecting unit 52. For example, when an input image is an image with only a small amount of features, there may only be a small number of detectable feature points. Therefore, there may be cases where the number of feature points selected by the feature point selecting unit 52 falls below the number of feature points determined by the selection number determining unit 60. In such a case, the selection number determining unit 60 can receive information on the number of feature points selected by the feature point selecting unit 52 from the feature point selecting unit 52 and once again determine the number of dimensions so that the specified feature descriptor size is reached by the number of selected feature points. This also applies to another pattern according to the third embodiment to be described later.

Next, a pattern in which the number of feature points is first determined will be described. For example, the selection number determining unit 60 can determine the number of feature points based on information defining a correspondence relationship between a specified feature descriptor size and the number of feature points. Information defining this correspondence relationship can be defined in a similar manner to the information defining a correspondence relationship between the specified feature descriptor size and the number of dimensions shown in FIG. 18. For example, a correspondence relationship can be defined so that the greater the specified feature descriptor size, the greater the number of feature points to be selected. Moreover, a correspondence relationship is not limited thereto and, for example, a correspondence relationship may be adopted in which a fixed number of feature points are associated regardless of the specified feature descriptor size.

In addition, based on the specified feature descriptor size and the determined number of feature points, the selection number determining unit 60 can determine the number of selected dimensions so that a feature descriptor size equals the specified feature descriptor size. Moreover, when the local feature descriptor generating unit 54 outputs a feature descriptor so as to include additional information such as a coordinate position of a feature point, the selection number determining unit 60 can determine the number of dimensions so that a feature descriptor size including a description size of the additional information equals the specified feature descriptor size.

Next, a pattern in which the number of feature points and the number of dimensions are simultaneously determined will be described. For example, the selection number determining unit 60 can determine the number of feature points and the number of dimensions based on information defining a correspondence relationship between a specified feature descriptor size, and the number of feature points and the number of dimensions. Information defining this correspondence relationship can be defined in a similar manner to the information defining a correspondence relationship between the specified feature descriptor size and the number of dimensions shown in FIG. 18. For example, a correspondence relationship can be defined so that the greater the specified feature descriptor size, the greater the number of feature points and the number of dimensions to be selected. Moreover, a correspondence relationship is not limited thereto and, for example, a correspondence relationship may be adopted in which a fixed number of feature points or a fixed number of dimensions is associated regardless of the specified feature descriptor size.

Moreover, when the local feature descriptor generating unit 54 outputs a feature descriptor so as to include additional information such as a coordinate position of a feature point, the selection number determining unit 60 can determine the number of feature points and the number of dimensions so that a feature descriptor size including a description size of the additional information equals the specified feature descriptor size.

As described above, with the local feature descriptor extracting apparatus 1C according to the third embodiment, the selection number determining unit 60 can determine the number of feature points to be selected by the feature point selecting unit 52 and the number of dimensions to be selected by the dimension selecting unit 56 based on specified feature descriptor size information. As a result, a size of a feature descriptor can be controlled to a desired size while maintaining accuracy of object identification.

Fourth Embodiment

Figure 19:
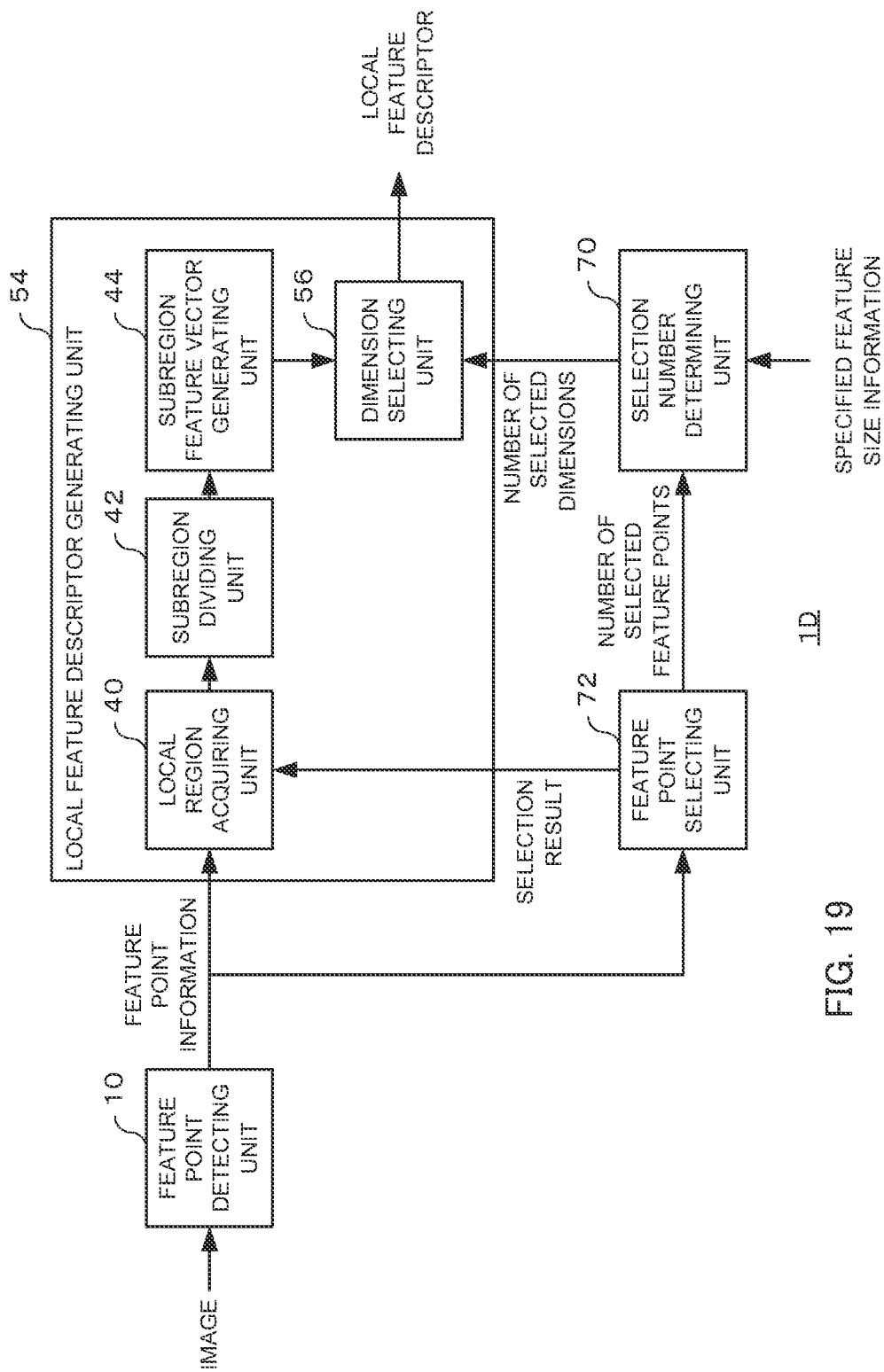
FIG. 19 is a diagram showing a configuration of a local feature descriptor extracting apparatus according to a fourth embodiment of the present invention.

Next, a fourth embodiment will be described. FIG. 19 is a diagram showing a configuration of a local feature descriptor extracting apparatus according to a fourth embodiment of the present invention. As shown in FIG. 19, a local feature descriptor extracting apparatus 1D is configured so as to include a feature point detecting unit 10, a selection number determining unit 70, a feature point selecting unit 72, and a local feature descriptor generating unit 54. In addition, the local feature descriptor generating unit 54 is configured so as to include a local region acquiring unit 40, a subregion dividing unit 42, a subregion feature vector generating unit 44, and a dimension selecting unit 56. As described above, with the local feature descriptor extracting apparatus 1D, the selection number determining unit 60 and the feature point selecting unit 52 of the local feature descriptor extracting apparatus 1C according to the third embodiment have been replaced by the selection number determining unit 70 and the feature point selecting unit 72. Moreover, same components as in the third embodiment are assigned the same reference symbols and descriptions thereof will be omitted.

In a similar manner to the feature point selecting unit 12 according to the first embodiment, the feature point selecting unit 72 performs feature point selection based on feature point information outputted from the feature point detecting unit 10. In addition, the feature point selecting unit 72 outputs information indicating the selected number of feature points to the selection number determining unit 70.

The selection number determining unit 70 can receive specified feature descriptor size information in a similar manner to the selection number determining unit 60 according to the third embodiment. In addition, based on the specified feature descriptor size information and the number of feature points selected by the feature point selecting unit 72, the selection number determining unit 70 can determine the number of dimensions so that a size of feature descriptors of an entire image equals the specified feature descriptor size.

Moreover, when the local feature descriptor generating unit 54 outputs a feature descriptor so as to include additional information such as a coordinate position of a feature point, the selection number determining unit 70 can determine the number of dimensions so that a feature descriptor size including a description size of the additional information equals the specified feature descriptor size.

As described above, with the local feature descriptor extracting apparatus 1D according to the fourth embodiment, the selection number determining unit 70 can determine the number of dimensions to be selected by the dimension selecting unit 56 based on the specified feature descriptor size information and the number of feature points selected by the feature point selecting unit 72. As a result, a size of a feature descriptor can be controlled to a desired size while maintaining accuracy of object identification.

Fifth Embodiment

Figure 20:
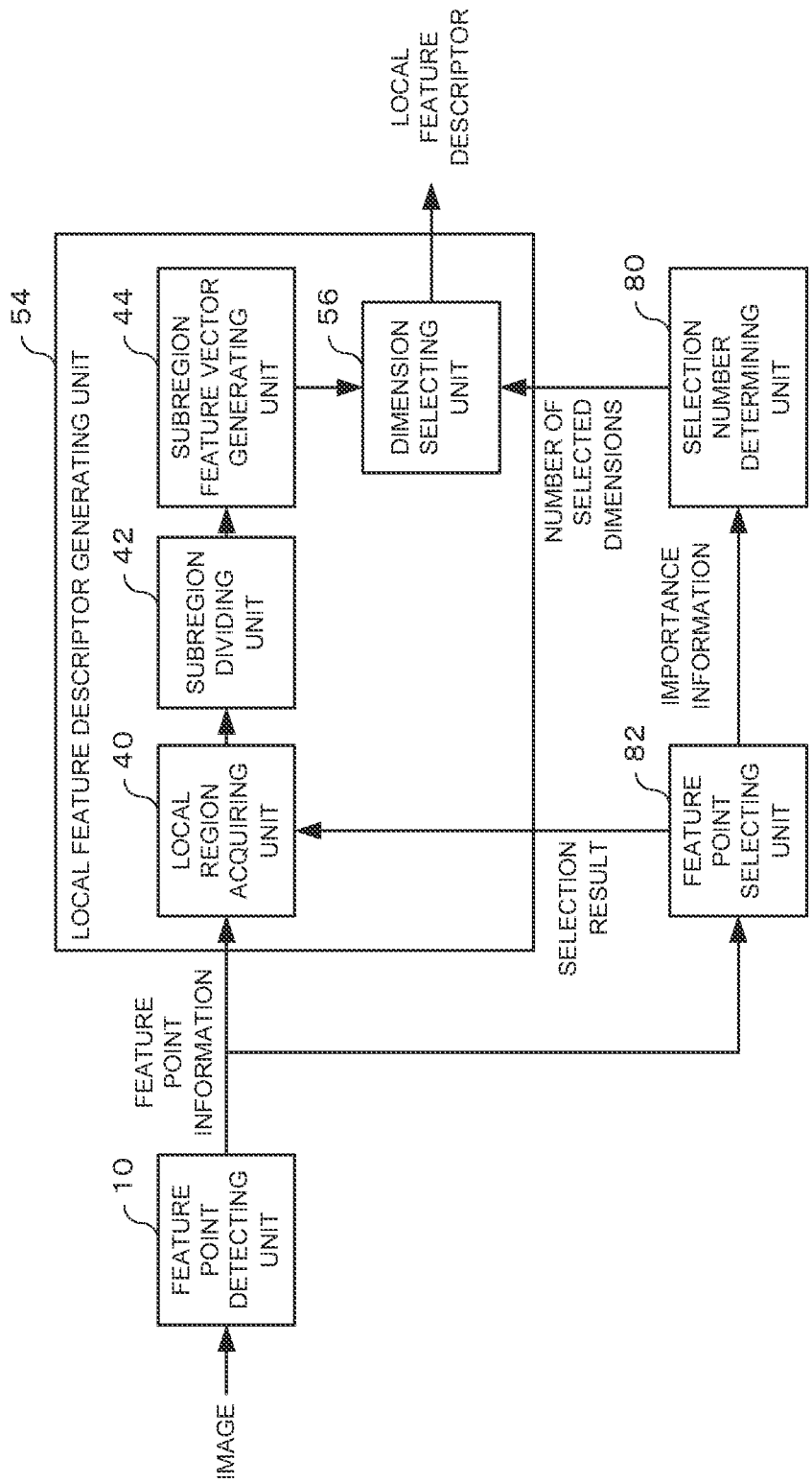
FIG. 20 is a diagram showing a configuration of a local feature descriptor extracting apparatus according to a fifth embodiment of the present invention.

Next, a fifth embodiment will be described. FIG. 20 is a diagram showing a configuration of a local feature descriptor extracting apparatus according to a fifth embodiment of the present invention. As shown in FIG. 20, a local feature descriptor extracting apparatus 1E is configured so as to include a feature point detecting unit 10, a selection number determining unit 80, a feature point selecting unit 82, and a local feature descriptor generating unit 54. In addition, the local feature descriptor generating unit 54 is configured so as to include a local region acquiring unit 40, a subregion dividing unit 42, a subregion feature vector generating unit 44, and a dimension selecting unit 56. As described above, with the local feature descriptor extracting apparatus 1E, the selection number determining unit 50 and the feature point selecting unit 52 of the local feature descriptor extracting apparatus 1B according to the second embodiment have been replaced by the selection number determining unit 80 and the feature point selecting unit 82. Moreover, same components as in the second embodiment are assigned the same reference symbols and descriptions thereof will be omitted.

In a similar manner to the feature point selecting unit 12 according to the first embodiment, the feature point selecting unit 82 performs feature point selection based on feature point information outputted from the feature point detecting unit 10. In addition, the feature point selecting unit 82 outputs importance information indicating an importance of each selected feature point to the selection number determining unit 80.

Based on the importance information outputted from the feature point selecting unit 82, the selection number determining unit 80 can determine the number of dimensions to be selected by the dimension selecting unit 56 for each feature point. For example, the selection number determining unit 80 can determine the number of dimensions so that the higher the importance of a feature point, the greater the number of dimensions to be selected.

Alternatively, the selection number determining unit 80 may be configured to receive specified feature descriptor size information and determine the number of dimensions so that a size of feature descriptors of an entire image equals the specified feature descriptor size in a similar manner to the selection number determining unit 70 according to the fourth embodiment. Specifically, for example, the selection number determining unit 80 may determine the number of dimensions so that the higher the importance of a feature point, the greater the number of selected dimensions and that a size of feature descriptors of an entire image equals the specified feature descriptor size.

Moreover, when the local feature descriptor generating unit 54 outputs a feature descriptor so as to include additional information such as a coordinate position of a feature point, the selection number determining unit 80 can determine the number of dimensions so that a feature descriptor size including a description size of the additional information equals the specified feature descriptor size.

As described above, with the local feature descriptor extracting apparatus 1E according to the fifth embodiment, the selection number determining unit 80 can determine the number of dimensions to be selected by the dimension selecting unit 56 for each feature point based on an importance of each feature point selected by the feature point selecting unit 82. As a result, a size of a feature descriptor can be controlled to a desired size while maintaining accuracy of object identification.

Applications

Figure 21:
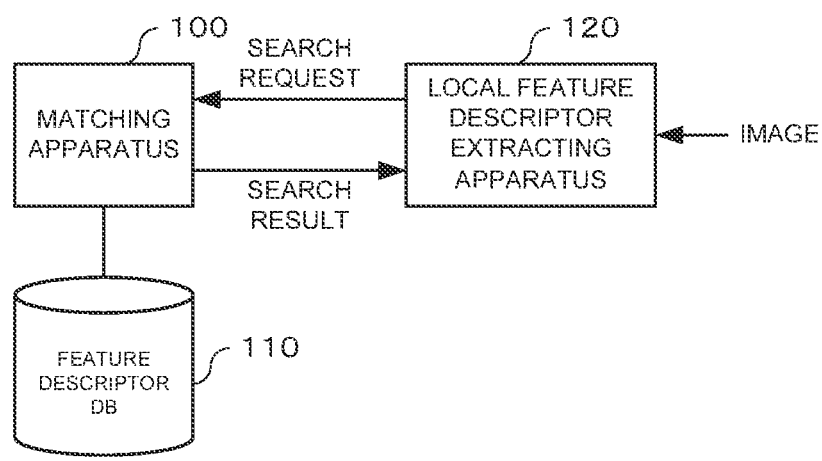
FIG. 21 is a diagram showing an example of a matching system to which a local feature descriptor extracting apparatus can be applied.

FIG. 21 is a diagram showing an example of a matching system to which the local feature descriptor extracting apparatuses presented in the first to fifth embodiments can be applied. As shown in FIG. 21, the matching system is configured so as to include a matching apparatus 100, a feature descriptor database (DB) 110, and a local feature descriptor extracting apparatus 120.

By collating a local feature descriptor included in a search request transmitted from the local feature descriptor extracting apparatus 120 with a local feature descriptor stored in the feature descriptor DB 110, the matching apparatus 100 can search an image including an object that is similar to an object in an image inputted to the local feature descriptor extracting apparatus 120.

The feature descriptor DB 110 stores local feature descriptors extracted from a plurality of images in association with images that are extraction sources. A local feature descriptor stored in the feature descriptor DB 110 can be, for example, a 150-dimension feature vector outputted in the order shown in FIG. 10.

The local feature descriptor extracting apparatus 120 can use the local feature descriptor extracting apparatus presented in any of the first to fifth embodiments.

The local feature descriptor extracting apparatus 120 generates a search request including a local feature descriptor of a feature point detected in the input image and transmits the search request to the matching apparatus 100. By collating the received local feature descriptor with a local feature descriptor stored in the feature descriptor DB 110, the matching apparatus 100 determines an image similar to the input image. Subsequently, the matching apparatus 100 outputs information indicating the image determined to be similar to the input image as a search result to the local feature descriptor extracting apparatus 120.

In such a matching system, with the local feature descriptor extracting apparatus 120, a dimension (element) to be outputted as a local feature descriptor is selected based on a positional relationship among subregions so that a correlation between neighboring subregions is reduced as described in the first to fifth embodiments. Therefore, a size of a local feature descriptor can be reduced while maintaining matching accuracy of the matching apparatus 100.

As a result, a communication time required to transmit a local feature descriptor from the local feature descriptor extracting apparatus 120 to the matching apparatus 100 can be reduced. In addition, since the size of a local feature descriptor is small, a processing load of matching on the matching apparatus 100 can be reduced. Furthermore, since a local feature descriptor has a hierarchical (progressive) structure as shown in FIG. 10, even if the number of dimensions of a local feature descriptor extracted by the local feature descriptor extracting apparatus 120 and the number of dimensions of a local feature descriptor stored in the feature descriptor DB 110 and in the memory 110 differ from one another, the matching apparatus 100 can perform a matching process using a local feature descriptor up to a mutually shared number of dimensions.

Figure 22:
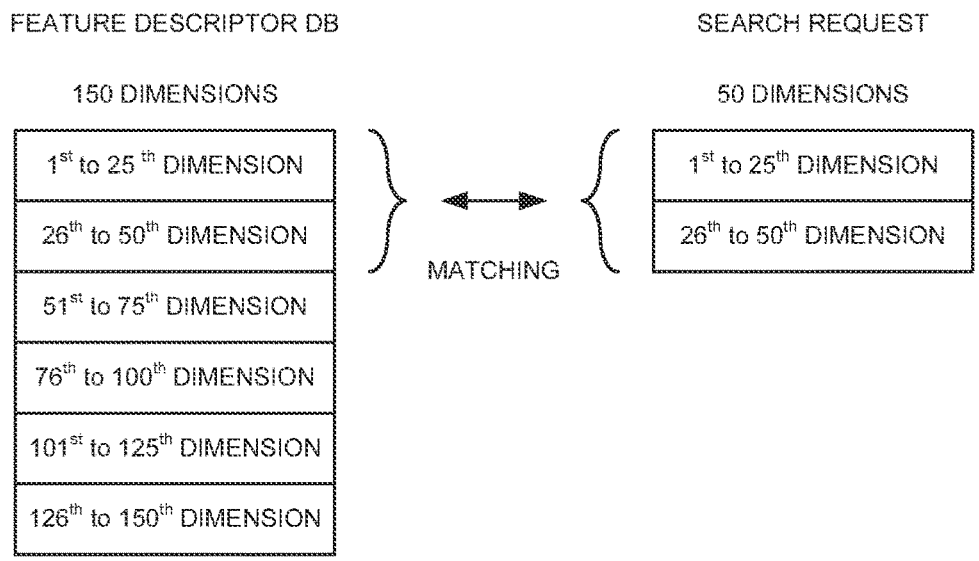
FIG. 22 is a diagram showing an example of matching using a local feature descriptor by a matching apparatus.
Figure 23:
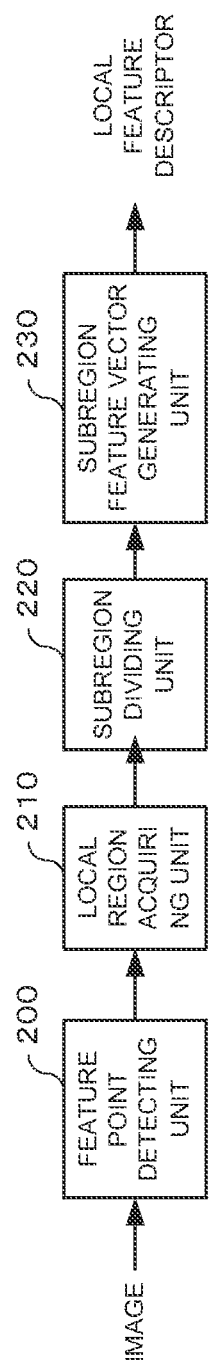
FIG. 23 is a diagram showing an example of a general configuration of a local feature descriptor extracting apparatus that uses a SIFT feature descriptor.

For example, as shown in FIG. 22, let us consider a case where a local feature descriptor stored in the feature descriptor DB 110 has 150 dimensions and a local feature descriptor extracted by the local feature descriptor extracting apparatus 120 has 50 dimensions. In this case, the matching apparatus 100 can perform matching by using up to 50 dimensions of both local feature descriptors. In other words, for example, even if the number of dimensions of a local feature descriptor is changed in accordance with processing capabilities of the local feature descriptor extracting apparatus 120, a matching process can be executed by the matching apparatus 100 using a local feature descriptor with the changed number of dimensions.

It should be noted that the present embodiment is for facilitating understanding of the present invention and is not for limiting the interpretation of the present invention. Various modifications and changes may be made to the present invention without departing from the spirit and scope thereof, and equivalents are to be included in the present invention.

The present application claims priority on the basis of Japanese Patent Application No. 2011-253223 filed on Nov. 18, 2011, the entire contents of which are incorporated herein by reference.

While the present invention has been described with reference to embodiments, the present invention is not intended to be limited to the embodiments described above. Various modifications to configurations and details of the present invention will occur to those skilled in the art without departing from the scope of the present invention.

A part of or all of the present embodiment may also be described as, but not limited to, the appendices provided below.

(Appendix 1) A local feature descriptor extracting apparatus including: a feature point detecting unit which detects a plurality of feature points in an image and which outputs feature point information that is information regarding each feature point; a feature point selecting unit which selects a prescribed number of feature points in an order of importance from the plurality of detected feature points, based on the feature point information; a local region acquiring unit which acquires a local region corresponding to each selected feature point; a subregion dividing unit which divides each local region into a plurality of subregions; a subregion feature vector generating unit which generates a feature vector of a plurality of dimensions for each subregion in each local region; and a dimension selecting unit which selects a dimension from the feature vector for each subregion so that a correlation between neighboring subregions is lowered, based on a positional relationship between subregions in each local region and which outputs an element of the selected dimension as a feature descriptor of the local region.

(Appendix 2) The local feature descriptor extracting apparatus according to Appendix 1, further including a selection number determining unit that determines the number of feature points to be selected by the feature point selecting unit and the number of dimensions to be selected by the dimension selecting unit.

(Appendix 3) The local feature descriptor extracting apparatus according to Appendix 2, wherein the selection number determining unit receives specified feature descriptor size information that is information for specifying a total size of a feature descriptor of the selected feature points and determines the number of feature points and the number of dimensions based on the specified feature descriptor size information.

(Appendix 4) The local feature descriptor extracting apparatus according to Appendix 3, wherein the selection number determining unit determines the number of feature points and the number of dimensions based on information indicating a correspondence relationship between the total size and the number of dimensions and on the specified feature descriptor size information.

(Appendix 5) The local feature descriptor extracting apparatus according to Appendix 3, wherein the selection number determining unit determines the number of feature points and the number of dimensions based on information indicating a correspondence relationship between the total size and the number of feature points and on the specified feature descriptor size information.

(Appendix 6) The local feature descriptor extracting apparatus according to Appendix 3, wherein the selection number determining unit determines the number of feature points and the number of dimensions based on information indicating a correspondence relationship among the total size, the number of feature points, and the number of dimensions and on the specified feature descriptor size information.

(Appendix 7) The local feature descriptor extracting apparatus according to Appendix 1, further including a selection number determining unit which receives selection result information indicating a selection result of feature points by the feature point selecting unit and which determines the number of dimensions based on the selection result information.

(Appendix 8) The local feature descriptor extracting apparatus according to Appendix 7, wherein the selection result information includes importance information indicating an importance of each selected feature point, and the selection number determining unit determines the number of dimensions for each selected feature point based on the importance information.

(Appendix 9) The local feature descriptor extracting apparatus according to Appendix 7 or 8, wherein the selection number determining unit further receives specified feature descriptor size information that is information for specifying a total size of a feature descriptor of the selected feature points and determines the number of dimensions based on the selection result information and the specified feature descriptor size information.

(Appendix 10) The local feature descriptor extracting apparatus according to any one of Appendices 1 to 9, wherein the dimension selecting unit selects dimensions from the feature vector so that at least one of the selected dimensions differs between adjacent subregions.

(Appendix 11) The local feature descriptor extracting apparatus according to any one of Appendices 1 to 10, wherein the dimension selecting unit selects dimensions from the feature vector according to a selection order for selecting dimensions in feature vectors of a plurality of subregions in a local region.

(Appendix 12) The local feature descriptor extracting apparatus according to Appendix 11, wherein the dimension selecting unit outputs an element of a selected dimension as a feature descriptor of the local region in an order of dimensions selected according to the selection order.

(Appendix 13) The local feature descriptor extracting apparatus according to any one of Appendices 1 to 12, wherein the feature point information includes scale information indicating a scale of each feature point, and the feature point selecting unit selects the prescribed number of feature points from the plurality of detected feature points based on the scale information in an order of importance according to scale.

(Appendix 14) The local feature descriptor extracting apparatus according to any one of Appendices 1 to 12, wherein the feature point selecting unit includes a feature point classifying unit that classifies the plurality of detected feature points into a plurality of groups based on the feature point information, and a representative feature point selecting unit that selects the prescribed number of feature points by selecting at least one feature point from each group.

(Appendix 15) A local feature descriptor extracting method for causing a computer to: detect a plurality of feature points in an image and output feature point information that is information regarding each feature point; select a prescribed number of feature points in an order of importance from the plurality of detected feature points, based on the feature point information; acquire a local region corresponding to each selected feature point; divide each local region into a plurality of subregions; generate a feature vector of a plurality of dimensions for each subregion in each local region; and select a dimension from the feature vector for each subregion so that a correlation between neighboring subregions is lowered, based on a positional relationship between subregions in each local region, and output an element of the selected dimension as a feature descriptor of the local region.

(Appendix 16) A program that causes a computer to realize the functions of: detecting a plurality of feature points in an image and outputting feature point information that is information regarding each feature point; selecting a prescribed number of feature points in an order of importance from the plurality of detected feature points, based on the feature point information; acquiring a local region corresponding to each selected feature point; dividing each local region into a plurality of subregions; generating a feature vector of a plurality of dimensions for each subregion in each local region; and selecting a dimension from the feature vector for each subregion so that a correlation between neighboring subregions is lowered, based on a positional relationship between subregions in each local region, and outputting an element of the selected dimension as a feature descriptor of the local region.

1A to 1E local feature descriptor extracting apparatus
10 feature point detecting unit
12 feature point selecting unit
14 local feature descriptor generating unit
40 local region acquiring unit
42 subregion dividing unit
44 subregion feature vector generating unit
46 dimension selecting unit

We claim:

1. A local feature descriptor extracting apparatus comprising:
a memory that stores a program; and
a processor configured to run the program stored in the memory that is configured to cause the processor to
detect a plurality of feature points in an image and output feature point information that is information regarding each feature point,
select a prescribed number of feature points in a descending order of scale from the plurality of detected feature points, based on the feature point information,
acquire a local region corresponding to each selected feature point,
divide each local region into a plurality of subregions,
generate a feature vector of a plurality of dimensions for each subregion in each local region, and
select a dimension from the feature vector for each subregion so that at least one gradient direction differs between neighboring subregions, based on a positional relationship between subregions in each local region and output an element of the selected dimension as a feature descriptor of the local region.

2. The local feature descriptor extracting apparatus according to claim 1, wherein the program is further configured to cause the processor to determine the number of feature points to be selected and the number of dimensions to be selected.

3. The local feature descriptor extracting apparatus according to claim 2, wherein the program is further configured to cause the processor to receive specified feature descriptor size information that is information for specifying a total size of a feature descriptor of the selected feature points and determine the number of feature points and the number of dimensions based on the specified feature descriptor size information.

4. The local feature descriptor extracting apparatus according to claim 3, wherein the program is further configured to cause the processor to determine the number of feature points and the number of dimensions based on information indicating a correspondence relationship between the total size and the number of dimensions and on the specified feature descriptor size information.

5. The local feature descriptor extracting apparatus according to claim 3, wherein the program is further configured to cause the processor to determine the number of feature points and the number of dimensions based on information indicating a correspondence relationship between the total size and the number of feature points and on the specified feature descriptor size information.

6. The local feature descriptor extracting apparatus according to claim 3, wherein the program is further configured to cause the processor to determine the number of feature points and the number of dimensions based on information indicating a correspondence relationship among the total size, the number of feature points, and the number of dimensions and on the specified feature descriptor size information.

7. The local feature descriptor extracting apparatus according to claim 1, wherein the program is further configured to cause the processor to receive selection result information indicating a selection result of feature points and determine the number of dimensions based on the selection result information.

8. The local feature descriptor extracting apparatus according to claim 7, wherein
the selection result information includes importance information indicating an importance of each selected feature point, and the program is further configured to cause the processor to determine the number of dimensions for each selected feature point based on the importance information.

9. A local feature descriptor extracting method for causing a computer to:
- detect a plurality of feature points in an image and output feature point information that is information regarding each feature point;
- select a prescribed number of feature points in a descending order of scale from the plurality of detected feature points, based on the feature point information;
- acquire a local region corresponding to each selected feature point;
- divide each local region into a plurality of subregions;
- generate a feature vector of a plurality of dimensions for each subregion in each local region; and
- select a dimension from the feature vector for each subregion so that at least one gradient direction differs between neighboring subregions is lowered, based on a positional relationship between subregions in each local region, and output an element of the selected dimension as a feature descriptor of the local region.

10. A non-transitory computer-readable storage medium storing a program for causing a computer to realize the functions of:
- detecting a plurality of feature points in an image and outputting feature point information that is information regarding each feature point;
- selecting a prescribed number of feature points in a descending order of scale from the plurality of detected feature points, based on the feature point information;
- acquiring a local region corresponding to each selected feature point;
- dividing each local region into a plurality of subregions;
- generating a feature vector of a plurality of dimensions for each subregion in each local region; and
- selecting a dimension from the feature vector for each subregion so that at least one gradient direction differs between neighboring subregions is lowered, based on a positional relationship between subregions in each local region, and outputting an element of the selected dimension as a feature descriptor of the local region.

* * * * *